United States Patent
Chandler, Jr. et al.

(10) Patent No.: US 11,192,797 B1
(45) Date of Patent: *Dec. 7, 2021

(54) PISTON VALVE WITH ANNULAR PASSAGES

(71) Applicant: Chandler Systems, Inc., Ashland, OH (US)

(72) Inventors: William D. Chandler, Jr., Ashland, OH (US); Aaron R. Wolfe, Ashland, OH (US); Cody A. Harbaugh, Ashland, OH (US)

(73) Assignee: CHANDLER SYSTEMS, INC., Ashland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/081,312

(22) Filed: Oct. 27, 2020

Related U.S. Application Data

(63) Continuation-in-part of application No. 16/793,501, filed on Feb. 18, 2020, now Pat. No. 10,865,124, (Continued)

(51) Int. Cl.
*B01D 24/38* (2006.01)
*C02F 1/00* (2006.01)
(Continued)

(52) U.S. Cl.
CPC ............. *C02F 1/008* (2013.01); *C02F 1/004* (2013.01); *C02F 1/325* (2013.01); *C02F 1/78* (2013.01); *F16K 11/0716* (2013.01); *F16K 31/04* (2013.01); *C02F 2103/002* (2013.01); *C02F 2201/005* (2013.01); *C02F 2209/008* (2013.01); *C02F 2209/02* (2013.01); *C02F 2209/03* (2013.01); *C02F 2209/05* (2013.01); *C02F 2209/40* (2013.01); *C02F 2303/16* (2013.01)

(58) Field of Classification Search
CPC ......... B01D 24/383; B01J 4/007; B01J 4/008; C02F 2301/005; C02F 2301/043
USPC .......... 137/625.67, 625.68, 625.69; 210/190, 210/191, 278
See application file for complete search history.

(56) References Cited

U.S. PATENT DOCUMENTS

| | | | | |
|---|---|---|---|---|
| 4,374,025 A | * | 2/1983 | Loke ......................... | C02F 1/42 210/140 |
| 4,919,314 A | * | 4/1990 | Nishiyama ................ | C02F 1/42 137/624.13 |

(Continued)

*Primary Examiner* — Paul J Gray
(74) *Attorney, Agent, or Firm* — Ralph E. Jocke; Walker & Jocke

(57) ABSTRACT

A control valve (10) includes a valve body with a plurality of ports (A, B, C, D, E, F) and a plurality of annular flow passages (53, 55, 57). A piston (34) which includes a plurality of annular flow passages and a longitudinal flow passage is selectively movable within a bore (32) within the valve body through operation of a valve controller (70). The valve controller is selectively operative to control the position of the piston so as to enable liquid flow through a plurality of flow paths. The valve controller further includes a installable and removable valve controller housing (74) which is releasibly engageable with a valve base (72). The valve may include a changeable multi-piece piston and changeable injector and plug components to adapt the valve to different flow and fluid mixing requirements.

20 Claims, 17 Drawing Sheets

Related U.S. Application Data which is a continuation of application No. 16/030,941, filed on Jul. 10, 2018, now Pat. No. 10,590,008, which is a continuation of application No. 15/968,024, filed on May 1, 2018, now Pat. No. 10,479,699, which is a continuation-in-part of application No. 15/590,733, filed on May 9, 2017, now Pat. No. 10,011,500, said application No. 16/030,941 is a continuation-in-part of application No. 15/652,483, filed on Jul. 18, 2017, now abandoned, which is a continuation-in-part of application No. 14/882,613, filed on Oct. 14, 2015, now Pat. No. 9,714,715, and a continuation-in-part of application No. 15/590,755, filed on May 9, 2017, now Pat. No. 10,012,319, and a continuation-in-part of application No. 14/698,381, filed on Apr. 28, 2015, now abandoned, and a continuation-in-part of application No. 14/698,399, filed on Apr. 28, 2015, now abandoned, and a continuation-in-part of application No. 15/261,442, filed on Sep. 9, 2016, now Pat. No. 9,970,558, and a continuation-in-part of application No. 14/024,918, filed on Sep. 12, 2013, now abandoned, which is a continuation-in-part of application No. 13/492,354, filed on Jun. 8, 2012, now Pat. No. 8,535,540.

(60) Provisional application No. 62/533,748, filed on Jul. 18, 2017, provisional application No. 62/522,294, filed on Jun. 20, 2017, provisional application No. 62/522,139, filed on Jun. 20, 2017, provisional application No. 61/607,343, filed on Mar. 6, 2012, provisional application No. 61/513,450, filed on Jul. 29, 2011, provisional application No. 61/494,449, filed on Jun. 8, 2011, provisional application No. 63/010,918, filed on Apr. 16, 2020, provisional application No. 62/119,507, filed on Feb. 23, 2015, provisional application No. 62/069,897, filed on Oct. 29, 2014, provisional application No. 61/986,423, filed on Apr. 30, 2014, provisional application No. 61/986,423, filed on Apr. 30, 2014.

(51) Int. Cl.
*C02F 1/32* (2006.01)
*C02F 1/78* (2006.01)
*F16K 31/04* (2006.01)
*F16K 11/07* (2006.01)
*C02F 103/00* (2006.01)

(56) References Cited

U.S. PATENT DOCUMENTS

| | | | | |
|---|---|---|---|---|
| 5,096,596 | A | * | 3/1992 | Hellenbrand ........... C02F 1/004 210/721 |
| 5,919,373 | A | * | 7/1999 | Naaktgeboren ........... C02F 1/64 210/750 |
| 6,206,042 | B1 | * | 3/2001 | Channell .................. C02F 1/00 137/271 |
| 6,402,944 | B1 | * | 6/2002 | Vaughan .................. C02F 1/42 137/597 |
| 6,596,159 | B1 | * | 7/2003 | Maruyama ............... B01J 49/85 137/624.11 |
| 6,696,963 | B2 | * | 2/2004 | Zimmerman ............. C02F 1/42 210/89 |
| 2005/0247634 | A1 | * | 11/2005 | Petty ....................... C02F 1/008 210/673 |
| 2010/0200522 | A1 | * | 8/2010 | Tischendorf .............. C02F 1/74 210/798 |

\* cited by examiner

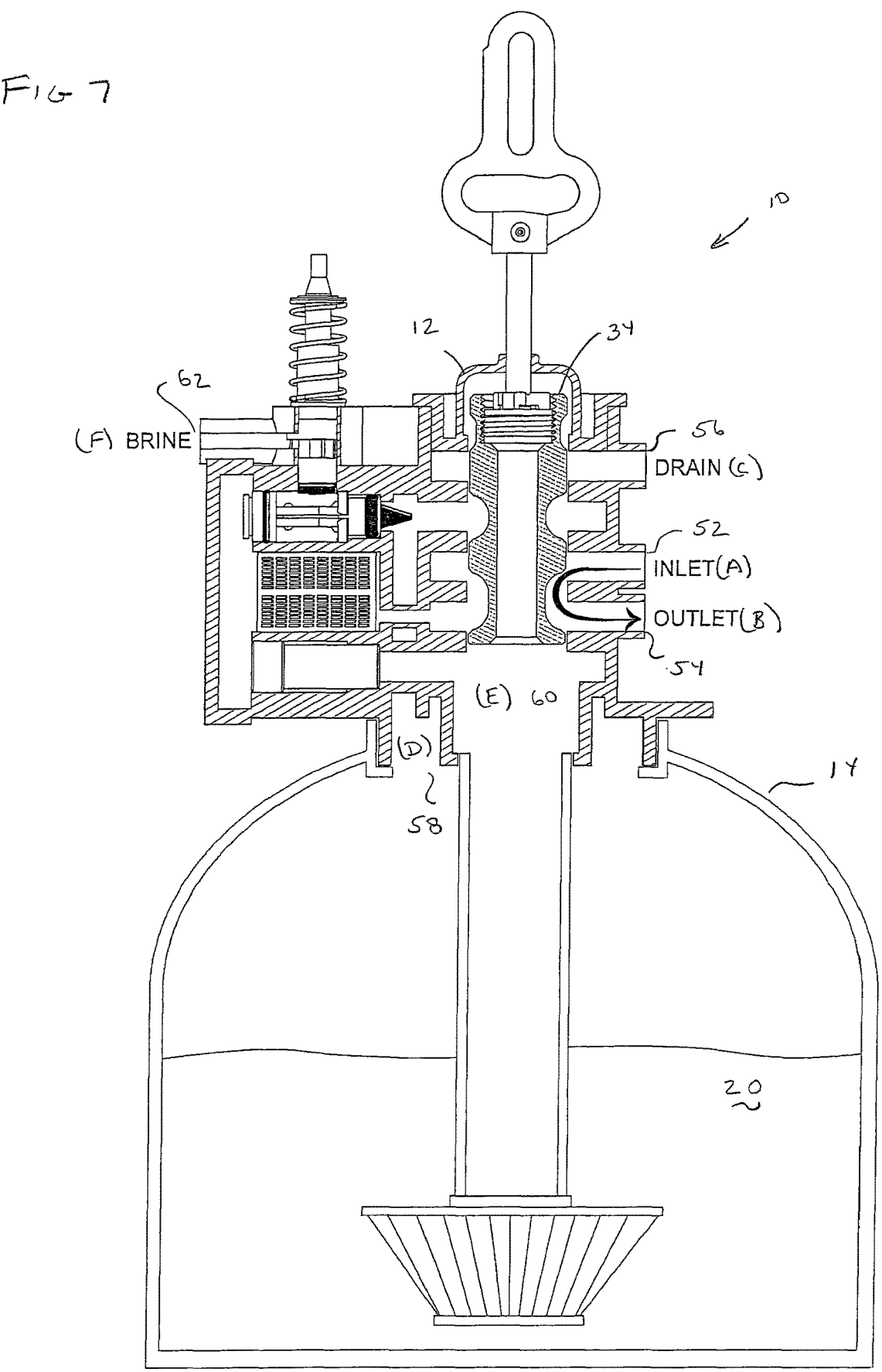

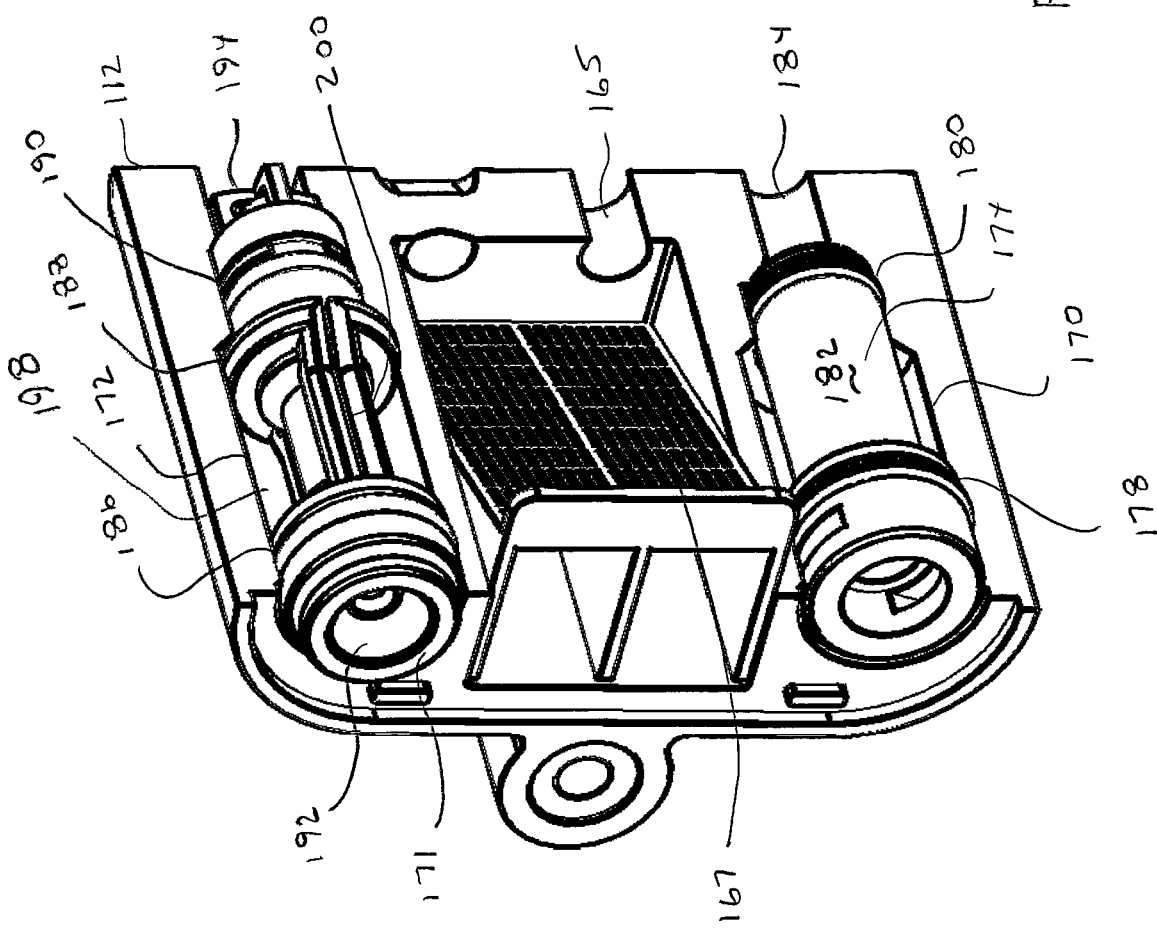

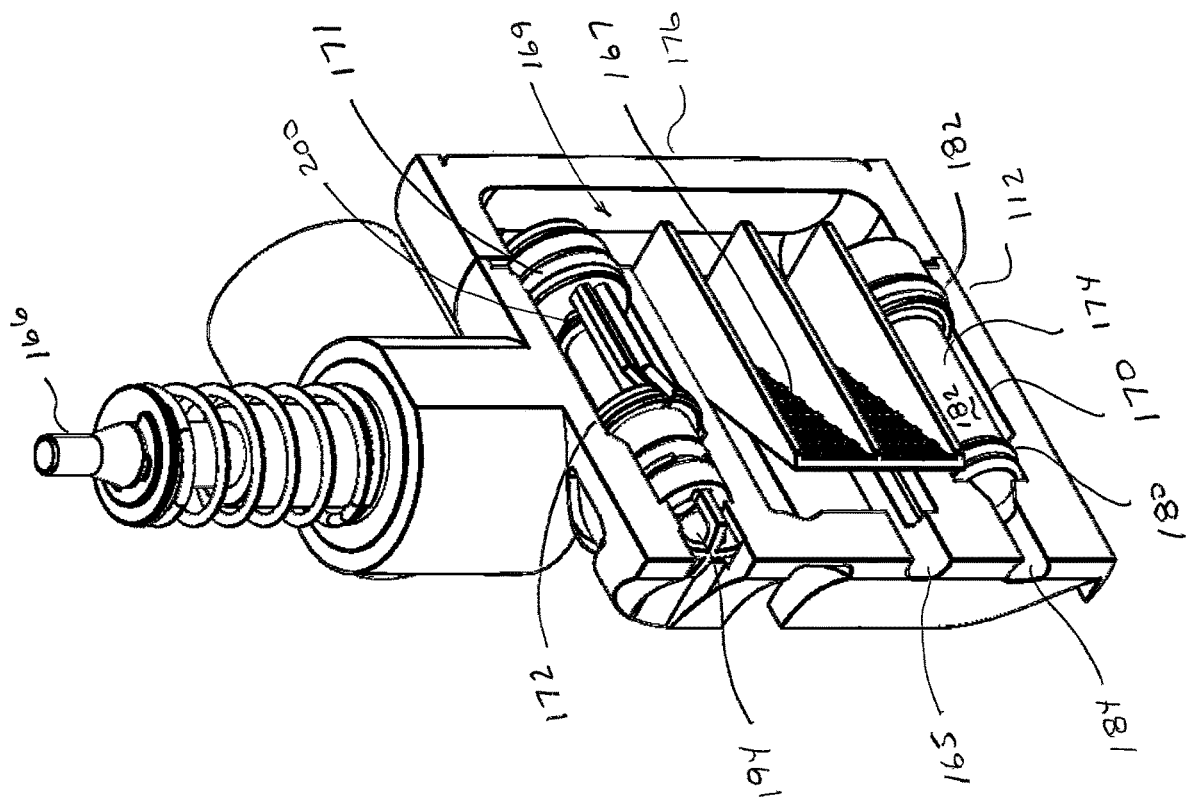

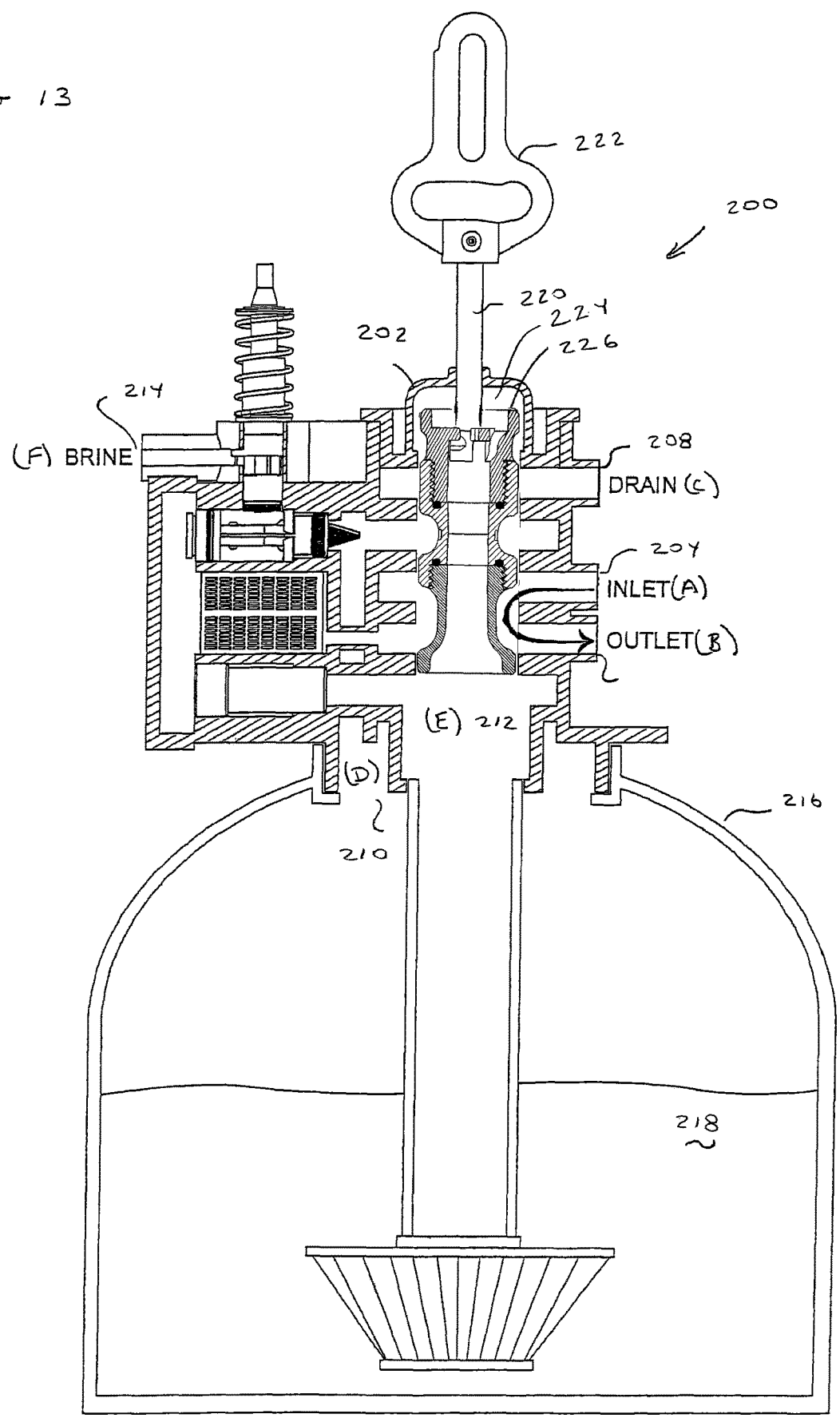

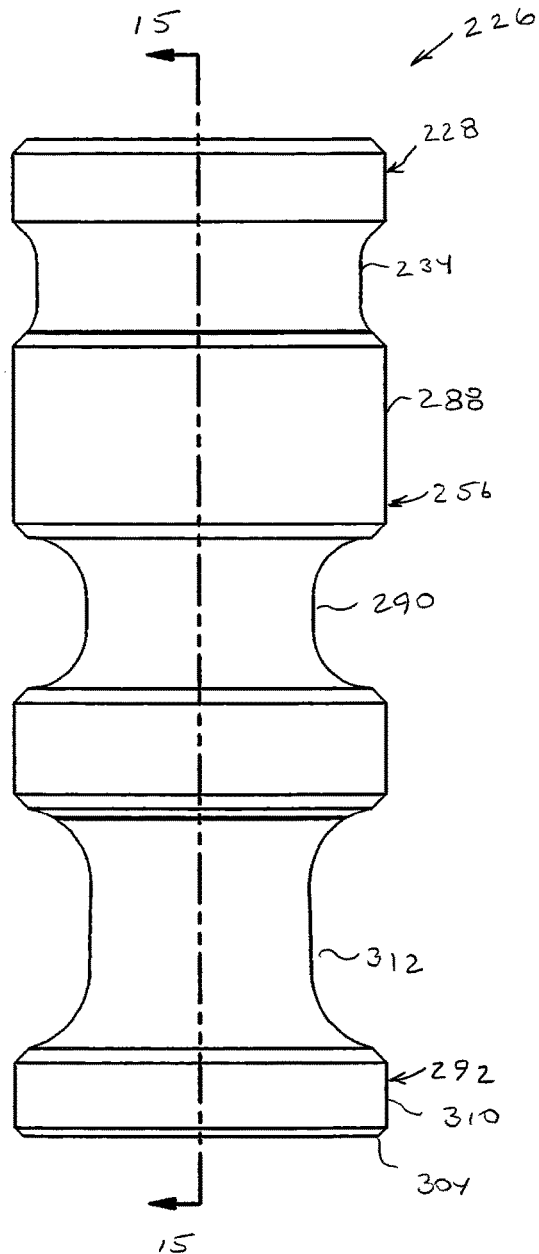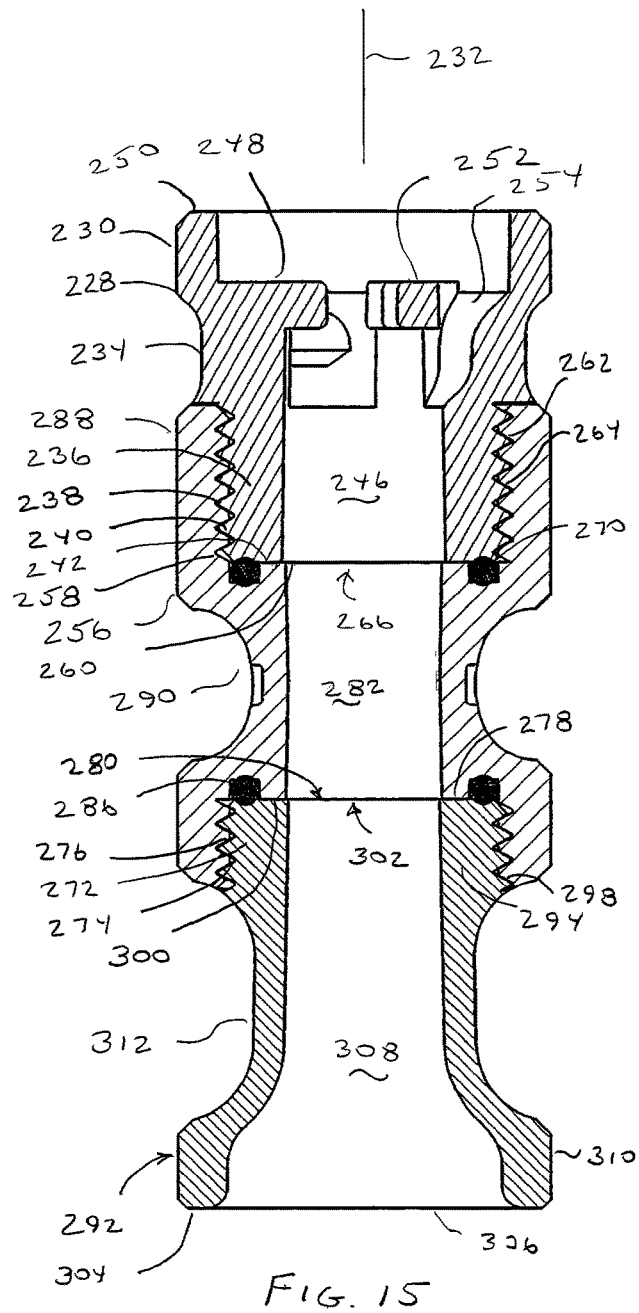

PISTON VALVE WITH ANNULAR PASSAGES

TECHNICAL FIELD

Exemplary arrangements relate to piston valves with annular passages which may be classified in CPC Class F16K 11/0716; US Class 137, Subclass 625.69. Exemplary embodiments relate to valve arrangements that are utilized in connection with devices which require fluid flow through multiple flow paths, for example, systems for water treatment.

BACKGROUND

Valve arrangements for controlling the flow of liquids may have numerous different forms. In situations where the liquid is required to be selectively directed to multiple different flow paths, such arrangements can be complex. Additional complexity may arise when different flow sequences and flow paths are required in connection with different process steps involving a liquid. Further complexity arises when liquids are required to be mixed with other fluids in connection with carrying out process flows.

Valve arrangements may benefit from improvements.

SUMMARY

Exemplary embodiments include a valve arrangement that is capable of selectively directing a liquid to multiple different flow paths. An exemplary embodiment includes a control valve having a valve body. An exemplary valve body includes an elongated longitudinal cylinder bore. The cylinder bore is in fluid communication with a plurality of different liquid ports which include inlet and outlet ports. The ports are in fluid connection with a plurality of respective generally annular passages extending adjacent to the bore within the valve.

An exemplary valve element comprising a piston is movably positionable longitudinally within the cylinder bore. The exemplary piston includes a profile configuration which includes a plurality of longitudinally disposed annular flow cavities. Selectively positioning the piston longitudinally in the bore through operation of a valve controller causes the different ports of the valve to be placed in fluid communication. The exemplary valve controller is operative to enable the valve to be used in conjunction with other process equipment for purposes of selectively directing the flow of liquid through the equipment in different flow paths during a plurality of process steps. Such process steps may include steps involving mixing of the liquid with other fluids and materials as required. The exemplary valve further includes the capability to selectively shut off liquid flow and to provide bypass flow in order to stop and bypass the flow of liquid from certain process equipment associated with the valve.

Exemplary arrangements specifically relate to a water control valve that is selectively operative to enable the removal of undesirable chemicals from water. The exemplary valve is operative to enable flow conditions to be changed to regenerate a resin material in a tank when necessary to maintain optimal performance of the system in removing undesirable substances. Exemplary arrangements further provide a valve that includes the functionality of an integrated water shutoff valve and a bypass valve. This exemplary valve arrangement eliminates the need for separate valves and piping to accomplish such functions.

Further exemplary arrangements include a readily changed or modified valve controller for operation of the exemplary valve. The exemplary valve controller enables the valve controller to be readily installed, removed and replaced when necessary for maintenance or repair purposes. Further the exemplary arrangement provides a means for readily operatively connecting the valve controller and the valve body so that they may operate together.

Numerous other novel arrangements and features are described in connection with the exemplary embodiments discussed herein.

BRIEF DESCRIPTION OF DRAWINGS

FIG. 7 is a view similar to FIG. 1 which shows the flow of liquid through the treatment tank bypassed through the valve.

FIG. 11 is an isometric partial cutaway view of a portion of the valve associated with a changeable injector.

FIG. 12 is an opposite hand partial cutaway showing the portion of the valve in FIG. 11.

FIG. 13 is a schematic cross-sectional view of an alternative exemplary control valve including an alternative movable piston valve element.

FIG. 14 is a side view of the exemplary alternative piston of the valve shown in FIG. 13.

FIG. 15 is a side cross-sectional view of the alternative piston taken along line 15-15 in FIG. 14.

DETAILED DESCRIPTION

The exemplary arrangements of the embodiments described herein may be used in conjunction with the components, features, systems and methods described in U.S. patent application Ser. Nos. 14/698,381 and/or 14,698, 399 filed Apr. 28, 2015, the disclosures of each of which are incorporated herein by reference in their entirety.

Figure 1:
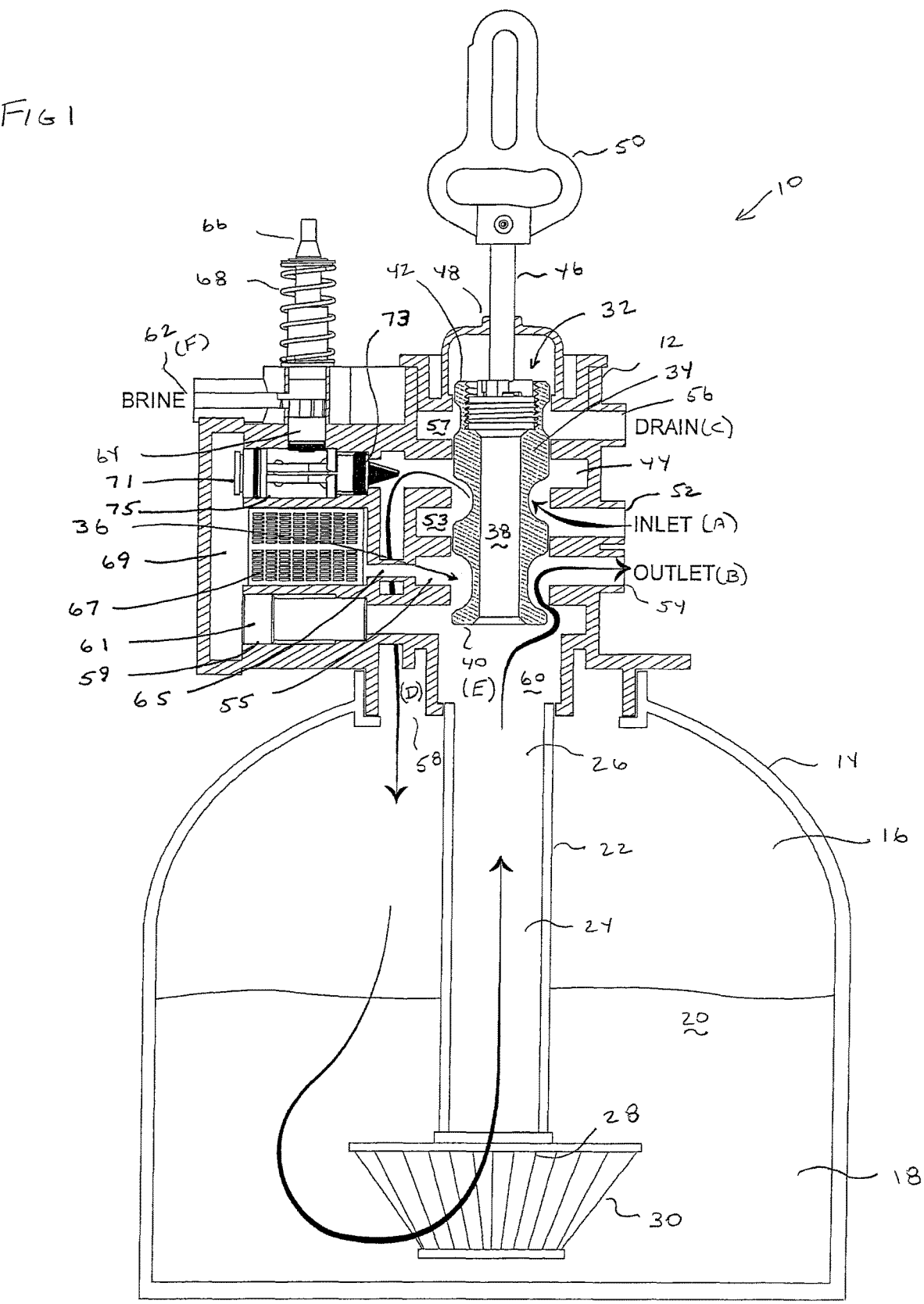
FIG. 1 is a schematic cross-sectional view of an exemplary control valve including a movable piston and a plurality of annular flow passages configured for use in connection with a water treatment tank.

Referring now to the drawings and particularly FIG. 1, it is shown therein an exemplary control valve generally indicated 10. Control valve 10 includes a valve body 12. The valve body 12 is schematically represented and is comprised of one or more parts which function in the manner that is represented schematically in FIGS. 1-8.

The exemplary valve is used in operative connection with a water treatment tank 14. Tank 14 of the exemplary arrangement is a water softener tank that extends generally vertically with the valve 10 positioned at the top thereof via a threaded or other releasable connection. It should be appreciated that the water treatment application is only an exemplary use for the control valve configuration and that the proportions of the tank as shown in the Figures are not necessarily representative of tanks that may be utilized in connection with the control valve described. Rather, in most water treatment arrangements the exemplary valve will be used with a vertically elongated tank which is many times longer than the height of the valve body. Further the exemplary valve may be used in conjunction with other types of processing systems and equipment.

The exemplary water treatment tank includes a top portion 16 and a bottom portion 18. The exemplary tank includes a water treatment material 20 therein. In some exemplary arrangements, the water treatment material 20 comprises resin material that is suitable for ion exchange with mineral laden water that is treated by flowing therethrough. Such resin material may be comprised of plastic beads or zeolite material that has a negative charge. The exemplary operation of the water treatment tank includes capturing ions in water that make the water "hard" such as calcium and magnesium ions and replacing such ions in the water with ions that are not undesirable such as sodium ions. In other embodiments other types of treatment materials other than ion exchange resin materials may be used. These materials may include absorbent materials, filtration materials, catalytic materials, dissolving materials, reacting materials or other types of materials. Of course it should be understood that the types of liquid processing, treatment materials and methods described are exemplary and in other arrangements, other types or additional types of equipment, materials, structures and elements for treating water or other liquids may be used.

In the exemplary arrangement, the tank 14 includes a central tube 22 extending vertically therein. Tube 22 includes an internal tube conduit 24. The exemplary tube conduit extends between a top end 26 of the tube and a bottom end 28 of the tube. The bottom end of the tube is fluidly open to the area of the tank that includes the resin material. The bottom end of the tube is in operative connection with a strainer 30. Strainer 30 operates to prevent the resin from entering the fluid conduit inside the tube.

The exemplary valve body includes at least one valve element that selectively places ports of the valve in fluid communication. An exemplary valve body includes an elongated cylindrical bore 32. The bore 32 is elongated in a longitudinal direction which is the vertical direction as the valve is shown in FIG. 1. The longitudinal direction may alternatively be referred to as an axial direction herein. The bore 32 has a movable cylindrical piston 34 therein. The piston 34 includes on its outer circumferential surface, a plurality of longitudinally spaced recessed annular flow cavities such as cavity 36. The exemplary piston 34 also includes a longitudinal flow cavity 38. Longitudinal flow cavity 38 extends through the piston from a first longitudinal end 40 to a second longitudinal end 42.

The exemplary valve body further includes a plurality of annular flow cavities 44 for example, that extend in at least partially surrounding relation of the bore 32. Although not shown in the drawings, but as described in the incorporated disclosures, exemplary embodiments include resilient seals that operatively extend between the piston and the walls of the valve body that extend radially inward toward the bore. The resilient seals are operative to prevent fluid flow between the radially outwardly disposed annular surfaces of the piston and the annular radially inward extending walls bounding the flow cavities of the valve body. In exemplary arrangements, the seals are configured to prevent fluid flow other than through flow cavities that are in operative fluid connection through the selective longitudinal positioning of the piston as described herein.

In the exemplary embodiment, the piston 34 is in operative connection with a piston rod 46. The piston rod 46 is operatively connected to the second longitudinal end of the piston. The exemplary piston rod is operatively connected to the piston through a releasable threaded connection as shown. In the exemplary embodiment the threaded connection includes a coupling with fluid openings therethrough that enables the flow of liquid through the longitudinal flow passage. The coupling also enables the piston to be removed and replaced with a piston of a different configuration.

The exemplary piston rod extends through an opening 48 in the valve body. A suitable resilient seal is provided adjacent the opening so as to prevent the escape of liquid from the inside of the valve body around the piston rod. The piston rod is operatively connected at the end outside the valve body to an actuator bracket 50. The actuator bracket 50 is in operative connection with a valve controller of a type later described herein and/or as described in the incorporated disclosures. The valve controller including at least one motor thereof is operative to selectively longitudinally move the actuator bracket and the piston rod so as to selectively longitudinally position the piston to provide different flow conditions. Of course it should be understood that this valve element configuration is exemplary and that in other embodiments other at least one valve element configurations such as rotating elements, shutter elements or other types of fluid flow directing elements may be used.

The exemplary valve body includes a plurality of ports. The ports include an inlet port 52 which is designated with the letter A for purposes of brevity. The exemplary inlet port is in operative connection with a source of untreated water. In exemplary embodiments, the source of untreated water may be a well, reservoir or other source of water that requires the treatment provided by passing the water through the water treatment material tank. In exemplary arrangements the untreated water is provided at an elevated pressure to the inlet port 52. This is accomplished through the use of a pump, the head of liquid in a tank or reservoir, or other suitable method for providing the water to the inlet port at a positive pressure. As represented schematically in Figures, the inlet port A is in operative fluid connection with an annular flow cavity 53 within the exemplary valve body.

The valve body further includes an outlet port 54. Outlet port 54 which is designated B for purposes of brevity, is configured to be in operative connection with one or more devices that use treated water. For example, the outlet port 54 may be fluidly connected to a piping system within the building in which the water treatment equipment is installed. In such an exemplary system the exemplary outlet port B is in operative connection with treated water use devices such as faucets, showers, hot water tanks, etc. which deliver, store and/or use water that has been treated by having passed through the tank. Of course this application is exemplary. As represented in Figures, the outlet port B is in operative connection with an annular flow cavity 55 within the valve body that is longitudinally disposed from the annular cavity in the valve body that is connected to Port A.

The exemplary valve body further includes a drain port 56. Drain port 56 which is designated C for purposes of brevity is configured in the exemplary system to be in operative connection with a drain which receives waste water. The drain port 56 is in operative connection with an annular flow cavity 57 within the valve body as represented in the Figures. Further it should be understood that although the drain port C is configured to be in connection with a wastewater drain, the water passed from the exemplary drain port may be captured for treatment and recycling or for other suitable purposes.

The exemplary valve body further includes a first tank port 58. The first tank port 58 is labeled D for purposes of brevity herein. In the exemplary arrangement the first tank port D is fluidly connected through the valve to a first area at the top of a tank. This first area is on an upper side of the resin material 20 in the tank. In the exemplary arrangement the first tank port 58 is above the level of the resin material 20 as shown. Of course it should be understood that this arrangement is exemplary and other arrangements of components may be used in connection with other embodiments.

The exemplary valve body further includes a second tank port 60. The second tank port 60 which is labeled E for purposes of brevity, is in operative connection with the tube conduit 24 within the tube 22. The second tank port 60 is in operative fluid connection with the lower area of the tank through an opening at the bottom end 28 of the tube and the strainer 30. The second tank port 60 is in operative fluid connection with the lower side of the resin material.

The exemplary valve body further includes a further port that in the exemplary system is referred to as brine port 62. Brine port 62 which is labeled F for purposes of brevity, is configured for operative connection with a brine tank. The brine tank of exemplary embodiments may provide a slurry of water softener salt and water which produces a brine solution which is utilized for regenerating the resin material in the tank in a manner that is later discussed. The exemplary brine port 62 is in operative connection with a movable valve member 64. The movable valve member 64 is movable within the valve body and depending on the position of the movable valve member, is operative to place the brine port 62 in fluid connection with at least one fluid cavity within the valve body. In the exemplary embodiment a moveable plunger 66 is in operative connection with the at least one movable valve member 64. A spring 68 is in operative connection with the plunger and serves to bias the plunger upwardly from the valve body as shown so as to close the valve member 64. As later explained in detail, the at least one motor of the valve controller is operative to selectively move the plunger 66 so as to operatively connect the brine port to flow cavities within the valve for purposes of delivering treated water out of the valve from the brine port and for receiving brine material from the brine tank.

In the exemplary embodiment the valve includes an injector 71. The injector 71 is positioned in a passage 75. The injector further includes a check valve 73. The check valve 73 enables flow from the injector to the flow cavity 44 and prevents flow in the opposite direction. In the exemplary arrangement the injector is removably positionable in the passage 75.

The exemplary valve body further includes a passage 59. In the configuration shown in FIG. 1, the passage 59 is closed by a removable plug 61.

The exemplary valve body further includes a passage 65. Passage 65 is fluidly connected with annular cavity 55. The valve body further includes a chamber 69. Chamber 69 is in fluid communication with passage 65. A screen 67 is positioned fluidly intermediate of the passage 65 and the chamber 69. Chamber 69 is in fluid connection with the injector 71.

The exemplary embodiment of the control valve operates in an exemplary system in a manner similar to that described in greater detail in the incorporated disclosure. A valve controller that is in operative connection and with the actuator bracket moves the bracket along the longitudinal direction which is the vertical direction as shown in FIG. 1 and selectively axially positions the piston to achieve a plurality of flow conditions along different flow paths through the valve. In an exemplary first condition of the valve represented in FIG. 1, untreated water is received into the valve through the inlet A. Water passes through the valve cavities of the piston and the valve body as represented by the arrows shown in FIG. 1. The untreated water is in fluid connection through the valve with the first tank port D. In this flow condition the check valve 73 prevents flow of untreated water through the injector 71 to cavity 55 and the outlet B. Untreated water flows from the first tank port downward through the top of the tank and into the resin material 20. In some exemplary arrangements the top of the tank may include a gas such as air or oxygen to react with materials dissolved in the incoming water to produce reaction products that can be more readily separated from the water. In the exemplary arrangement the water passing through the resin material undergoes an ion exchange in which calcium, magnesium and other positively charged ions in the water are captured by the resin and replaced in the water with sodium ions which are present in the resin.

In the condition shown in FIG. 1 the water that has been treated by passing downward through the resin passes through the strainer 30 and travels upwardly through the tube conduit 24 to the second tank port E. From this position the now treated water passes through the valve body from the second tank port E to the treated water outlet port B. The treated water is passed from the water outlet B to piping and to the devices which use the treated water.

Figure 2:
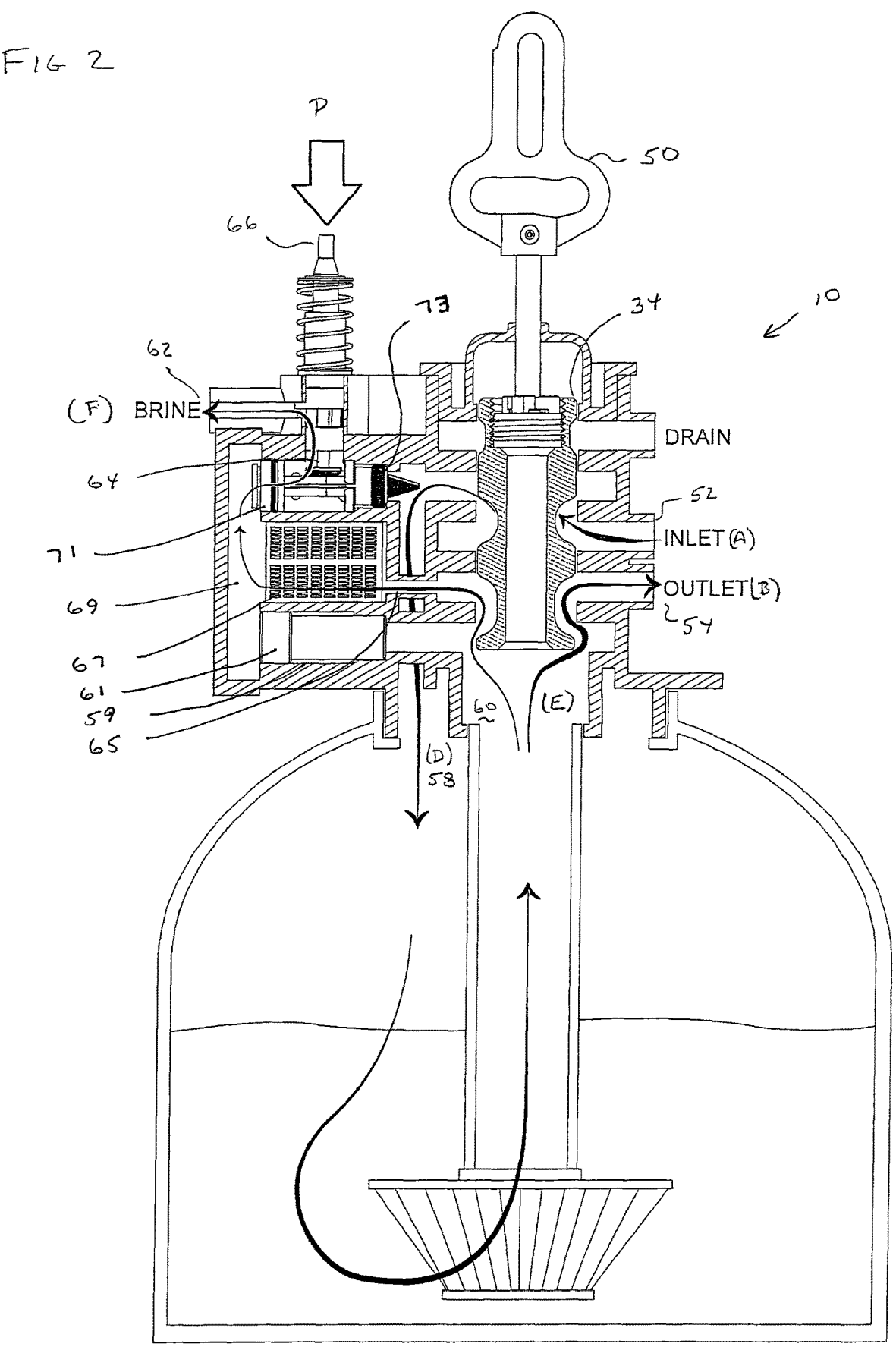
FIG. 2 is a view similar to FIG. 1 which shows the control valve in a different operating condition.

In the exemplary embodiment the valve controller operates the valve to deliver treated water from the brine port F of the valve to the brine tank at selected appropriate times. This is done in the exemplary system so that the brine solution is available for delivery to the valve 10 and the resin material 20 when required. In order to provide available brine, the valve controller is operative to depress plunger 66 downward as represented by arrow P as shown in FIG. 2. Moving the plunger downward is operative to move the movable valve member 64. Movement of the valve member 64 enables water that has been treated by passing through the resin and received at the second tank port E to be passed out of the valve through the brine port F.

In this valve configuration, the treated water passes through the passage 65, through the screen 67 and into the chamber 69. From the chamber 69 the water flows into the interior of the body of the injector 71 (later described in detail) and to the brine port F past the open valve element 64. It should be noted that the check valve 73 prevents the flow of untreated water into the body of the injector 71. Further, passage 59 which has a configuration similar to the passage which includes the injector body 71, is fluidly blocked by the plug 61 so as to require treated water to flow through the passage 65, the screen 67 and chamber 69 into the injector body.

In the exemplary system treated water is passed out through the brine port for a sufficient time to enable production of suitable brine solution by mixing of the water with water softener salt that has been placed in the brine tank. The production of the brine and the measurement of the salt levels and other features associated with the brine tank are discussed in the incorporated disclosures. As can be appreciated from FIG. 2, with the piston 34 positioned as shown, while treated water is being delivered to the brine tank the exemplary valve continues to deliver treated water from the second tank port E of the tank to the water outlet B.

After a period of operation of the exemplary system, the amount of water that has been treated by passing through the resin material causes the ions in the resin material to change their character to the point that the undesirable calcium and magnesium ions in the untreated water are no longer satisfactorily replaced through the ion exchange with the more desirable sodium ions. When this condition occurs, the resin treatment material can be cleaned and regenerated in the manner discussed in the incorporated disclosures and as described herein, so as to return the resin material to satisfactory performance. In various embodiments the need to regenerate the resin may be determined on a timed basis, on the basis of the amount of water that has passed through the tank, or based upon sensing the properties of the treated water that has been delivered from the outlet B through suitable electronic sensors. As can be appreciated, in exemplary systems while the resin in the water softener is being regenerated, treated water may be supplied to the devices and systems that use treated water from a storage tank holding a supply of treated water or by treating the water with another water treatment device.

Figure 3:
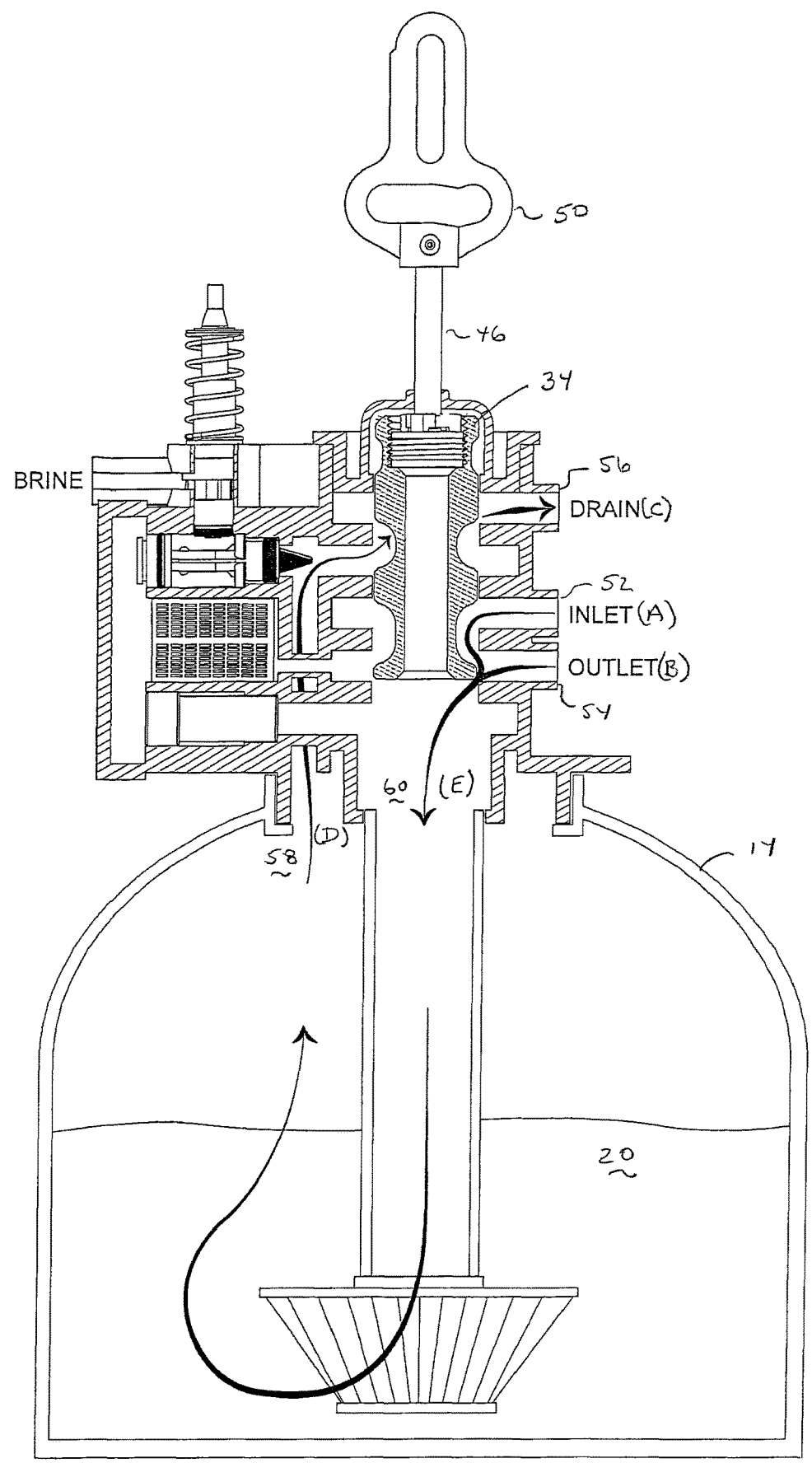
FIG. 3 is a view similar to FIG. 1 which shows the control valve in yet another operating condition.

Operation of the exemplary valve in a first step in a treatment media regeneration process is represented in FIG. 3. As shown in FIG. 3, the piston 34 of the valve is moved so as to be disposed upward from the positions shown in FIGS. 1 and 2. This is done in the exemplary embodiment by moving the piston in the longitudinal direction by movement of the actuator bracket 50 and the piston rod 46.

Movement of the piston 34 to the position shown in FIG. 3 causes the inlet and outlet ports A and B of the valve to be in fluid connection with the second tank port E. Further in this position of the piston, the first tank port D is in operative connection through the valve body with the drain C. As represented by the water flow arrows shown in FIG. 3, the untreated water at the elevated pressure and some treated water which can be drawn back through the water outlet port B, pass through the valve to the second tank port E and downward through the tube 22. The water passes through the bottom of the tube and outwardly through the strainer. The water is dispersed and flows upwardly through the resin 20 so as to backwash the resin. The backwash represents a reversal from the normal flow during water treatment and causes particles and other materials that have been captured in the resin to flow upward in the tank.

The water flowing upward in the tank flows into the first tank port D and through the valve body to the drain port C. As a result, the particulates and other contaminants that can be dislodged and removed by backwashing the resin are caused to flow out the top of the tank, through the valve and are discharged to a suitable waste drain through the drain port C. The backwash portion of the cycle continues for a suitable time in accordance with the programming of the valve controller or associated control device to achieve the release of the majority of the particulates and contaminants that have been captured in the resin material. The backwash operation may be continued on a timed or other basis sufficient to complete the operation.

Figure 4:
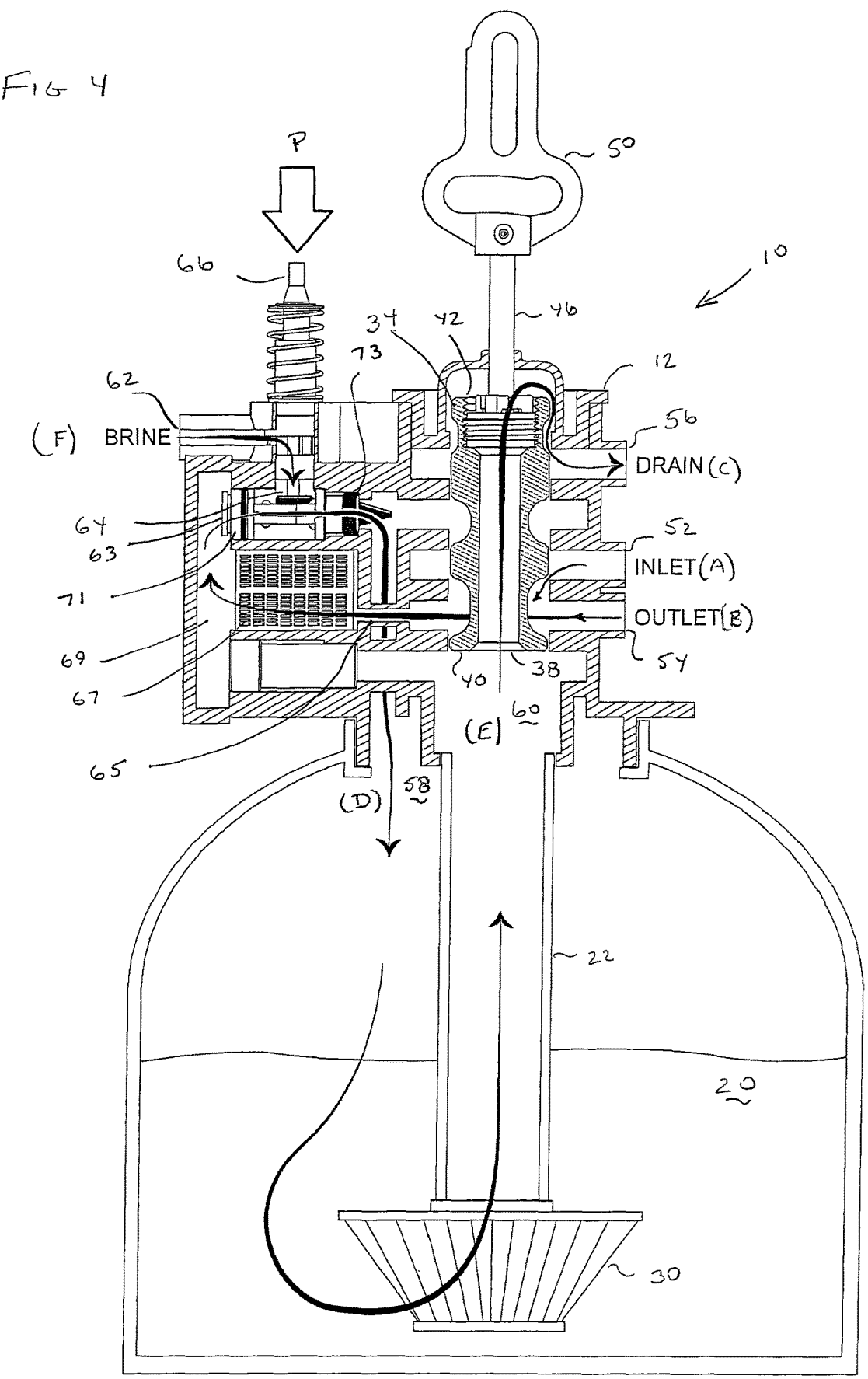
FIG. 4 is a view similar to FIG. 1 which shows the control valve in another operating condition.

At the conclusion of the backwash function, the exemplary valve controller is operative to change the condition of the valve to that shown in FIG. 4. In the position of the piston 34 shown in FIG. 4, water under higher pressure from the inlet A as well as water pulled from the outlet B passes through the valve body to the first tank port D. In this condition, the exemplary valve controller is operative to depress the plunger 66 and move the movable valve member 64 so as to open a flow path in the valve body. This causes the brine port F to enable brine solution to be received by the valve from the brine tank, into the flow of water as it moves through the valve body and to the first tank port D at the top of the tank. In exemplary embodiments brine delivered to the brine port F may be pressurized through operation of a pump or similar device so as to facilitate the delivery of the brine into the valve body. In other arrangements, the brine may be moved into the flow of water through venturi action or other suitable action which is suitable for causing the brine to be moved into the brine port F and mixed in the water that is flowing through the flow cavities of the valve body 12.

In the exemplary arrangement, treated water flows through the passage 65 and the screen 67 into the chamber 69. From the chamber, the water flows through an opening 63 and into the interior of the body of the injector 71. The incoming brine from brine port F mixes with the water in the interior of the injector body and flows in the direction in which flow is permitted past the check valve 73 at the inward end of the injector 71. Once the brine containing water passes the check valve 73, it flows through an interior passage of the valve to the first tank port D.

In the position of the exemplary valve element and valve controller represented in FIG. 4, water including the fresh water softener salt solution passes through the area at the top of the tank and passes downward into the resin material 20. The ions from the brine material flow into and migrate in the resin material, regenerating the supply of sodium ions therein and displacing the calcium, magnesium and other ions currently bonded to the resin particles therein. The water and the ions that are displaced from the resin material pass through the strainer 30 at the bottom of the tube 22 and flow upwardly to the second tank port E at the bottom of the valve. In this position of the valve piston 34 the water passing upwardly through the tube 22 passes through the longitudinal flow cavity 38 of the piston, through the flow cavity at the top of the valve body and out the drain port C. As a result, undesirable material is washed out of the resin and moved to the drain port.

Figure 5:
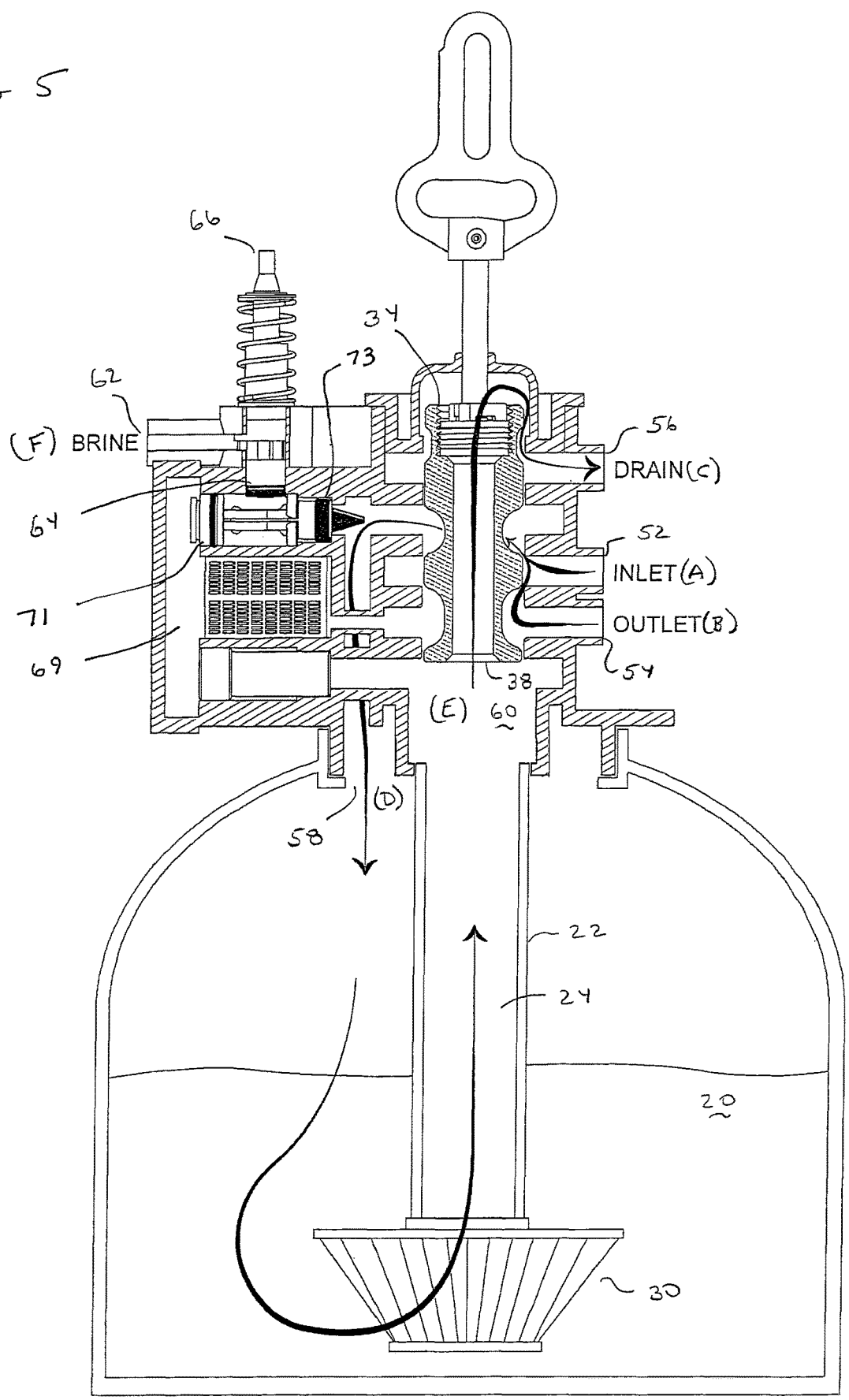
FIG. 5 is a view similar to FIG. 1 which shows the control valve in another operating condition.

The condition of the valve represented in FIG. 4 is maintained through operation of the valve controller for a period of time sufficient to draw an amount of brine into the tank that will regenerate the resin. Thereafter the exemplary valve controller operates to cause the plunger 66 to no longer be positioned to cause the movable valve member 64 to enable brine to enter the valve body through the brine port F. As represented in FIG. 5, the at least one motor of the valve controller changes the position of piston 34 such that untreated water from the inlet A and water otherwise received from the outlet B pass through the valve body to the first tank port D. The check valve 73 of the injector 71 prevents flow to chamber 69 through the injector. The water which no longer has the new brine mixed therein passes downwardly through the bed of resin material 20 through the strainer and into the tube conduit 24 within the tube 22.

In this condition of the exemplary valve, the water from the tube conduit passes upwardly through the tube 22 and the second tank port E, through the longitudinal flow cavity 38 in the piston and outwardly to the drain port C of the valve body. Such flow through the resin provides a rinse function which is operative to cause any remaining regenerate brine material in excess of that which is captured within the resin material to be rinsed out and passed to the drain. The condition of the valve shown in FIG. 5 is maintained through operation of the valve controller for a sufficient time to clear the excess regenerate material from the tank. This may be done in some embodiments on a timed basis or other basis sufficient to accomplish the function.

Generally after regenerating the resin material as just described, the exemplary valve is returned by the valve controller to the flow condition which is shown in FIG. 1. In this condition, untreated water enters the inlet A of the valve body, passes through the valve body to the first tank port D. The water then passes through the resin 20 where it undergoes water treatment to remove undesirable materials and ion exchange is accomplished. The treated water then passes upwardly through the tube 22 to the second tank port E. The treated water then passes out of the valve body through the outlet B through which it is delivered to the water distribution system in the building and the water use devices. Generally the valve remains in this condition until the cycle for regenerating the resin material needs to be repeated.

It should be noted that in the exemplary embodiment the position of the piston 34 in the rinse position of the valve shown in FIG. 5, is immediately linearly longitudinally adjacent to the piston position 34 when the valve is in its usual service mode of operation in which untreated water is treated by flowing through the resin in the resin in the tank 14. This configuration minimizes the introduction of untreated water or other undesirable material when the condition of the valve is changed between the last step in which the remaining regenerate material is rinsed and removed from the tank, and the valve causes the system to go back into normal service mode. Of course it should be understood that this approach is exemplary and in other arrangements other approaches may be used.

The exemplary control valve 10 further provides the function of a valve shutoff which in the exemplary system separates the water treatment tank 14 from the untreated water inlet A. This function can avoid the need for an external shutoff valve to prevent untreated water from flowing to the control valve and the tank.

Figure 6A:
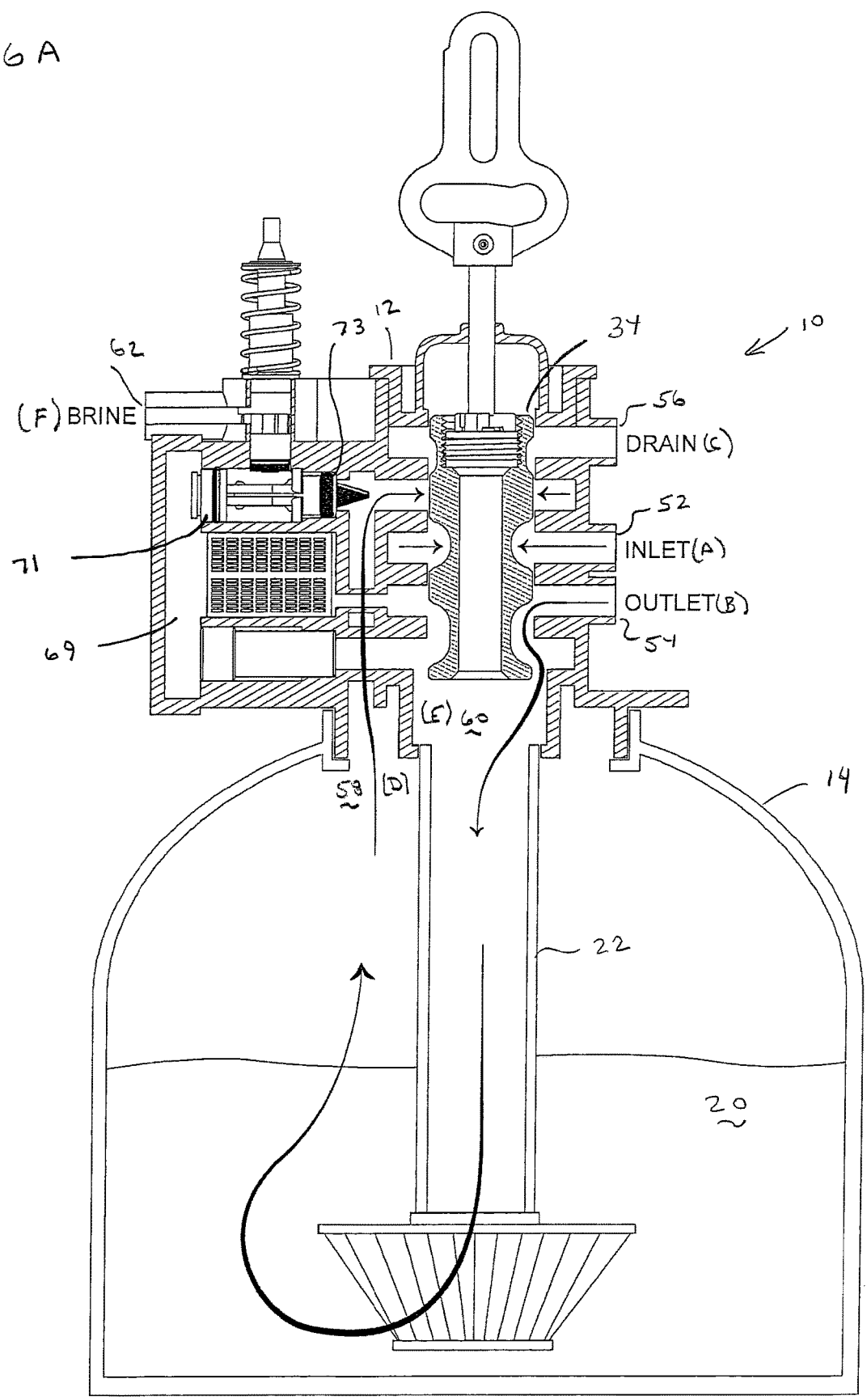
FIG. 6A is a view similar to FIG. 1 showing the control valve in another operating condition in which flow of liquid into the valve is shut off and pressure on the outlet port is maintained.

FIG. 6A represents the condition of the exemplary valve 10 in a shutoff condition. As can be appreciated in the exemplary system when it is desired to shut off the flow of untreated water to the valve and to the tank, the valve controller operates to cause the piston 34 to be moved axially to the position shown in FIG. 6A. In this position of the piston 34, the flow of untreated water into the inlet A is stopped by the position of the piston in which the annular flow cavities then connected to the inlet are not open to any other flow cavities within the valve.

As represented in FIG. 6A, the first tank port D is likewise in communication with a flow cavity within the valve that is not fluidly connected to any other flow cavity. In this position of the piston, the water outlet B is in operative connection with the second tank port E. Water pressure is effectively maintained at the outlet B unless a water use device is turned on which reduces such pressure. As a result, flow is effectively discontinued on a selective basis through actuation of the valve controller. Of course it should be understood that this particular configuration is exemplary and in other embodiments, other configurations may be utilized for purposes of shutting off the flow between the water inlet A and the water outlet B.

Figure 6B:
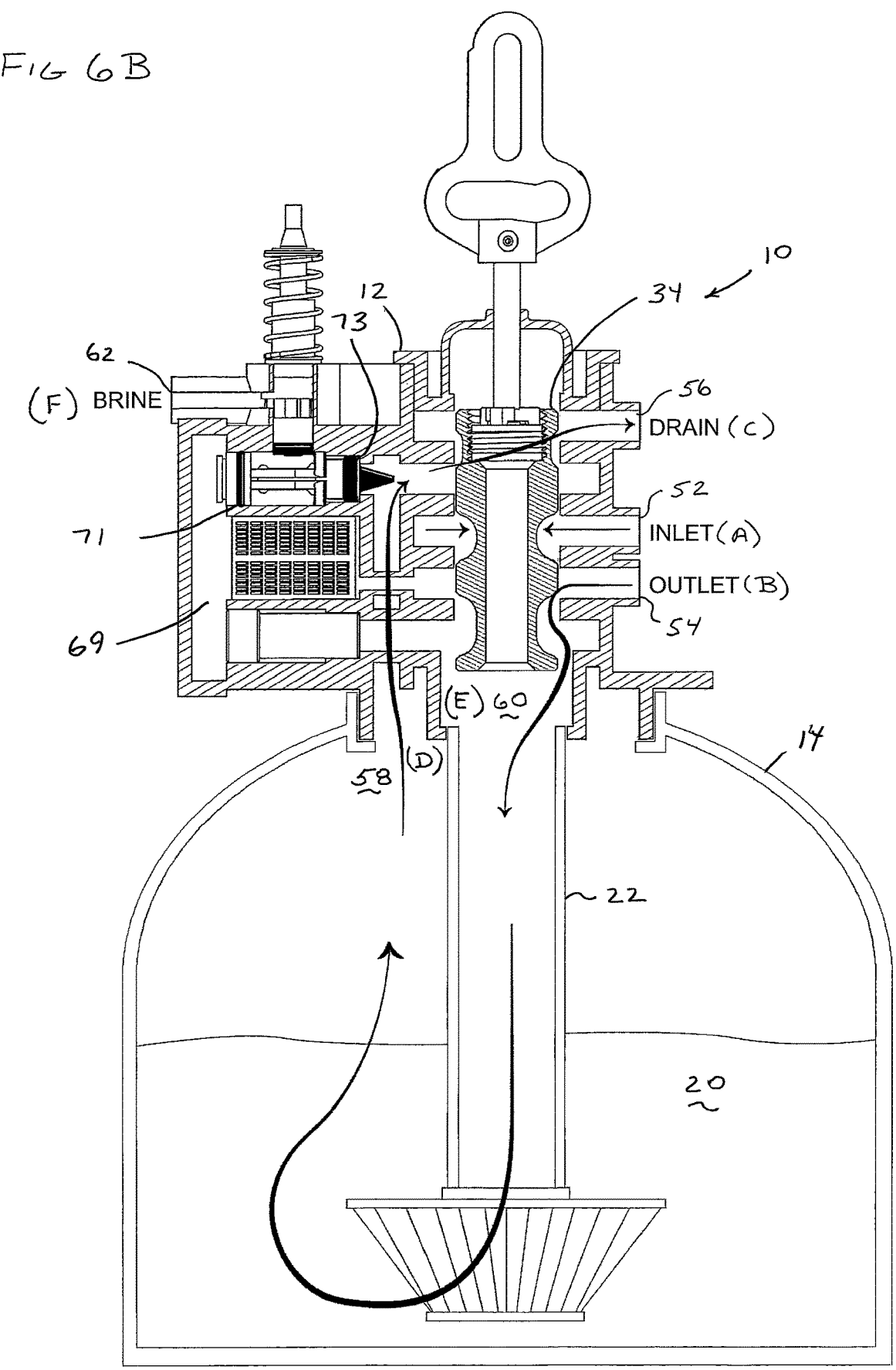
FIG. 6B is a view similar to FIG. 1 showing the control valve in another operating condition in which flow of liquid into the valve is shut off and pressure on the outlet port is relieved.

FIG. 6B represents the exemplary valve in a further shutoff condition. In the shutoff condition shown in FIG. 6B, the exemplary piston 34 is in a somewhat different longitudinal position from the position of the piston in FIG. 6A. In the position shown in FIG. 6B, the flow of untreated water into inlet A is stopped and untreated water supplied at the inlet does not flow through the valve to any other port.

However, in the position of the piston 34 in FIG. 6B fluid pressure at outlet port B is relieved to the drain port C. This is achieved by having fluid ports B, E, D and C in fluid communication. In this position of the valve element almost all the fluid pressure is released from the outlet port C as well as from the lines and devices of the water delivery system to which the valve is connected.

In some exemplary arrangements the valve may be placed with the valve element in the shut off position shown in FIG. 6A or FIG. 6B depending on the circumstances under which flow through the valve is shut off. For example in systems for water management such as described in the incorporated disclosures of U.S. patent application Ser. Nos. 14/698,381 and/or 14/698,399, the valve may be controlled to be in the shutoff condition with pressure maintained on the outlet port B when the fluid flow is to be shut off, but the delivery system is to remain pressurized at the normal level. In such circumstances the exemplary valve is configured as shown in FIG. 6A. However, if the water management system operates in response to conditions where the outlet port and water distribution system is programmed to be depressurized, the controller operates to configure the exemplary valve in the shutoff position shown in FIG. 6B. This may be done for example, when a probable system leak is detected. In such circumstances the central controller of the water management system may operate to minimize water damage, by not only shutting off further incoming water, but also by relieving pressure at the outlet port B so that water in the distribution system can pass out of the valve to the drain C. This may reduce the amount of water which comes out of the system at the site of the leak. Of course this approach is exemplary and in other embodiments, other approaches may be used.

A further feature of the exemplary embodiment of valve 10 when used in the exemplary water treatment system is the ability to operate the valve controller to allow incoming water to bypass the water treatment tank 14. For example in an exemplary system there are some situations such as when delivering water to an external spigot to wash off a sidewalk, irrigate plants and the like, when it may not matter that the water is untreated. Further in some situations the amount of water required for a particular activity may be relatively large compared to the amount of water that is used in circumstances where it is highly desirable for the water to be treated by having been treated by having passed through the tank 14.

In situations where it is desirable to deliver untreated water for use by a particular device, the exemplary valve controller may be operated to cause the piston 34 in the valve 10 to be moved to the longitudinal position shown in FIG. 7. In this piston position, untreated water which is delivered at the inlet A is passed through the valve body directly to the outlet B without passing through the resin material 20 in the tank. In this way, the untreated water is provided to the water use devices for as long as untreated water is desired. After the activity is accomplished for which the untreated water will be used, suitable signals can be delivered to the valve controller to return the valve condition to that shown in FIG. 1 in which the water is again treated by passing through the tank.

Of course it should be understood that the valve configuration shown is exemplary and in other embodiments other valve configurations having different valve body arrangements, valve element configurations, ports and other structures may be utilized. Further, while the exemplary embodiment has been described in connection with a water treatment process, other embodiments may be utilized in connection with other types of fluid treatment equipment and processes.

The exemplary embodiment of the valve controller includes features that enable the valve controller housing to be readily installed in connection with the valve. Further this exemplary construction enables the valve controller to be readily replaced or serviced.

Figure 8:
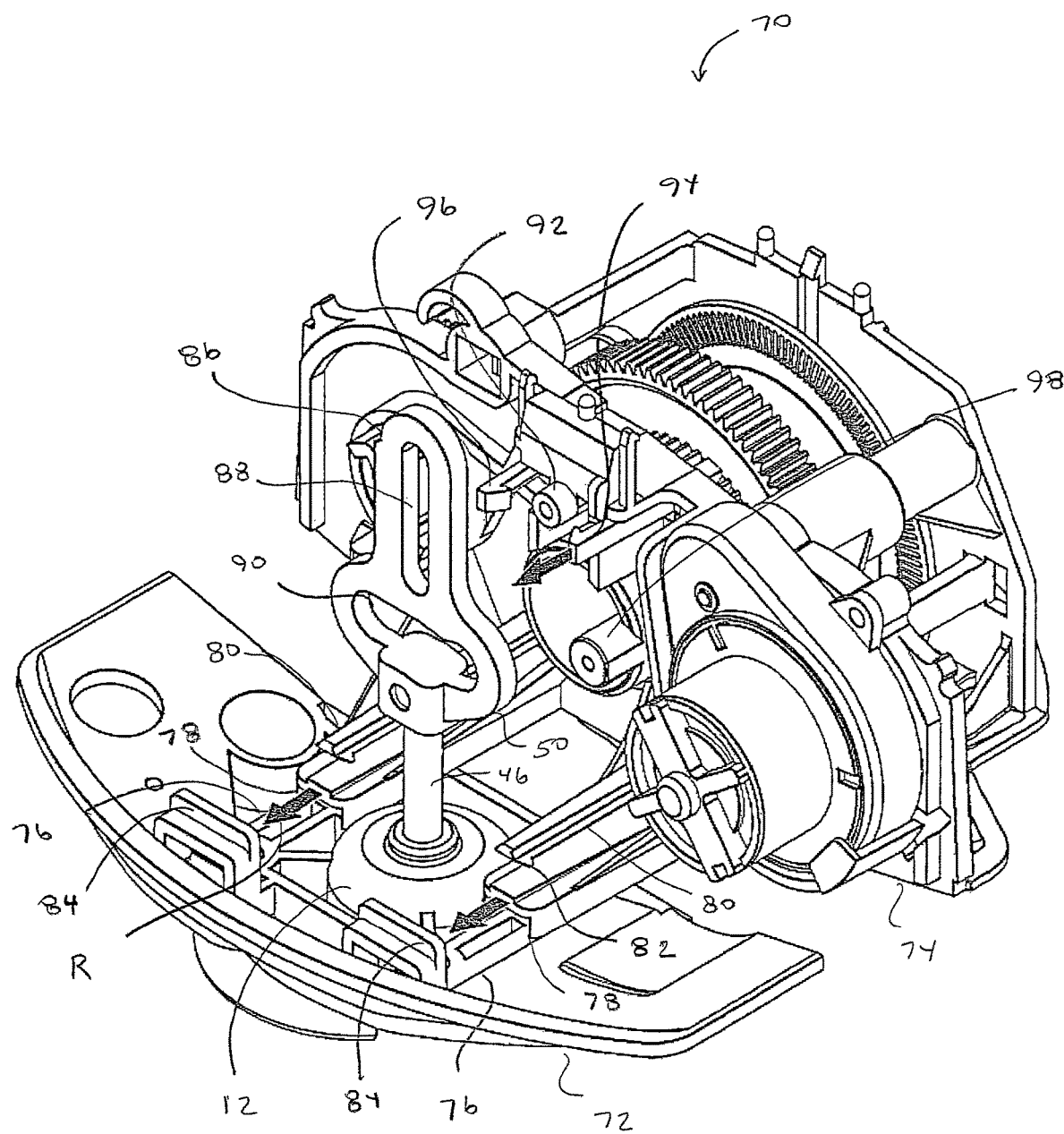
FIG. 8 is an isometric view showing an exemplary valve controller housing and a valve base being moved toward an operative position.
Figure 9:
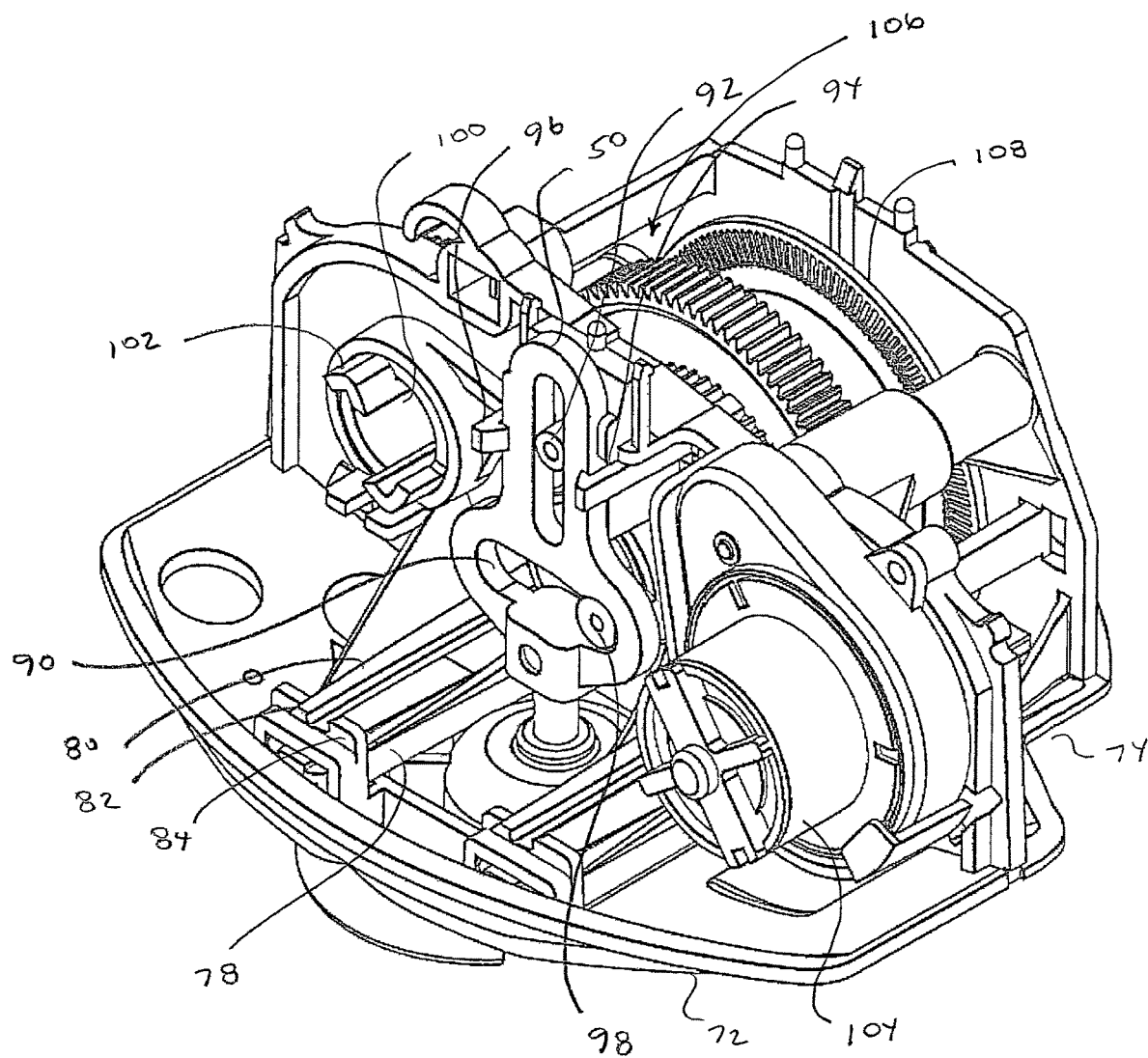
FIG. 9 shows the valve base and valve controller housing in an operative position.

An exemplary embodiment of the valve controller 70 is represented in FIGS. 8 and 9. The exemplary valve controller is operative to selectively move the actuator bracket 50 and the piston rod 46 to position the piston 34 longitudinally within the valve body 12 in the manner previously discussed herein. The actuator 70 may include the features and devices of the incorporated disclosures so as to carry out this function. Of course it should be appreciated that in other embodiments, other types of structures, devices and mechanisms may be utilized for purposes of providing selectively controlled movement of one or more valve elements.

In the exemplary embodiment of the controller 70 a valve base 72 is configured to be in operative connection with the valve body 12 of the valve 10. A valve controller housing 74 is configured to be selectively engageable with the valve base and placed in an operative position in which the valve controller may change the condition of the valve. The valve controller housing 74 is also configured to be readily disengageable from the valve base for reconfiguration, replacement or repair.

In the exemplary arrangement, the valve controller housing and the valve base include interengaging projections and slots to provide for the secure engagement and selective disengagement of the valve base and housing. Although it should be understood that the interengaging projections and slots may be in fixed connection with either of the engageable components, in the exemplary embodiment the valve base includes a pair of elongated rail projections 76. The pair of elongated rail projections 76 extend on opposed sides of the piston rod 46 and extend generally perpendicular to the longitudinal direction in which the piston rod is moveable.

The exemplary elongated rail projections are configured to be engaged in captured relation by elongated recessed slots 78. Elongated slots 78 extend in portions of the valve controller housing 74. The exemplary slots 78 are configured such that the rails 76 once extended therein are captured and immovable in all directions except along the direction of the rail projections designated by arrows R in FIG. 8. The secure engagement of the projections and slots may be achieved in different embodiments by interengaging tabs, flanges or other structures on the projections and slots which only enable such items to be engaged and disengaged by movement along the direction of arrows R.

The exemplary valve controller housing 74 further includes a pair of deformable members 80. Deformable members 80 each terminate at a hook 82. Each hook 82 is configured to engage and hold tabs 84 that are operatively connected with at least one wall when the valve controller housing is in the operative position as shown in FIG. 9. It should be understood, however, that the hook and tab configuration shown is exemplary and in other arrangements, the configuration may be reversed such that the hooks are included in engagement with the valve base and the structures for engaging the hooks are included on the valve controller housing. Further, other structures may be utilized for selectively holding and releasing the valve base and valve controller housing in the operative position.

In the exemplary arrangement, the actuator bracket 50 is configured to be readily operatively engaged with and disengaged from the structures which operate to selectively move the actuator bracket which are part of the valve controller housing. In the exemplary arrangement, the actuator bracket 50 includes a longitudinally elongated guide yoke portion 86. Guide yoke portion 86 includes a longitudinally elongated guide slot 88. The exemplary actuator bracket is further configured to include an actuator recess 90. Actuator recess 90 includes an elongated actuator slot that is elongated in a direction transverse to the longitudinal direction.

In an exemplary arrangement, the guide slot 88 in the guide yoke portion is configured to accept a guide pin 92 on the housing in movable relation therein. In the exemplary arrangement, the valve controller housing 74 includes a pair of deformable holding projections 94. The holding projections are spaced apart in symmetric relation relative to guide pin 92 and are sized to enable the guide yoke portion 86 to extend in movable relation between the holding projections. In the exemplary arrangement, each of the holding projections includes an angled hook end 96. Hook ends 96 of the holding projections 94 extend in facing relation and are configured to enable the guide yoke portion to be moved between the holding projections and held between the projections by the hook ends. As a result, the guide yoke portion is enabled to move in a longitudinal direction while positioned between the holding projections and in guided relation in the longitudinal direction by the guide pin 92. Further the hook ends 96 serve to prevent the guide yoke portion from moving out of the area between the holding projections and being disengaged from the guide pin.

It should be understood that this approach is exemplary and in other arrangements, one or more guide pins may be positioned on an actuator bracket which engage with slots or other openings in the housing. Further other structures may be utilized for engaging the actuator bracket or similar structures in releasable movable connection.

Further in the exemplary arrangement, the actuator recess 90 is configured to receive therein an actuator pin 98. Actuator pin 98 of the exemplary arrangement is operative to be selectively moved in an arcuate path responsive to operation of the valve controller 70. In the exemplary arrangement, the actuator pin 98 is positioned on a rotatable member that is selectively rotated so as to control the relative vertical position of the actuator pin, and thus control the movement and longitudinal position of the piston 34 through longitudinal movement of the actuator bracket 50.

In the exemplary arrangement, the actuator pin is selectively moved in an arcuate path which causes the pin 98 to move relatively transversely within the actuator recess 90. The selective positioning of the actuator pin 98 along its arcuate path as determined through operation of the valve controller 70 is usable to selectively position the actuator bracket 50 and the piston 34 in operative connection therewith, in the desired positions to achieve the desired flow conditions through the valve.

Further, the exemplary arrangement enables the bracket to be readily operatively disengaged from the valve controller housing 74. As can be appreciated, disengagement of the deformable members 80 from the tabs allows relative movement of the valve base 72 and the valve controller housing 74 along the direction of arrow R and in an opposed direction from when the base and housing are being engaged. In the exemplary arrangement, the holding projections 94 are movable and deformable to enable the hook ends 96 to release the guide yoke portion 86 of the bracket 50 from being held in intermediate relation of the holding projections 94. In addition, in the exemplary embodiment the actuator pin 98 may be moved out of the elongated actuator slot 90. Thus the actuator housing and the components attached thereto may be readily disengaged from the valve base 72. Thereafter a new valve controller housing 74 may be readily engaged with the valve base 72 and the actuator bracket 50. Such replacement may be done for repair or maintenance purposes. Alternatively an alternative valve actuator housing may be installed to provide additional or different features and functions for operation of the valve and related components such as the exemplary water treatment system. For example a valve controller that operates based on wired connections with other system components may be replaced with a valve controller that communicates wirelessly with other components, and vice versa. Alternatively the valve controller may be replaced to convert the valve and associated equipment to operate via a different method of operation. Of course it should be understood that these approaches are exemplary and in other embodiments, other approaches may be used.

Further in the exemplary arrangement as shown in FIG. 9 the valve controller housing 74 includes a rotatable member 100 which includes cam surfaces 102 thereon. The cam surfaces 102 are configured to operatively engage the plunger 66 and displace the plunger so as to control the movement of the movable valve member 64 within the valve body. In the exemplary arrangement the rotatable member 100 and cam surfaces 102 are configured so that the valve controller housing 74 can be disengaged from the valve base 72 without interference with the plunger member 66. This further facilitates the ready installation and replacement of the valve controller housing. As can be appreciated, the exemplary valve controller includes a pair of cam surfaces 102 which enables opening the movable valve member twice during a single rotation of the rotatable member. This may correspond, for example, to operation of the valve and its associated equipment in connection with a method that requires opening of the movable valve element 64 two times during a particular operation cycle such as the one previously described. Of course it should be understood that in other embodiments, different numbers of cam surfaces may be utilized. Further other exemplary arrangements may include valves with additional valve elements and cam members so as to enable the introduction of other liquids and fluids into the valve at various selected cycle times during operation of the valve and the associated equipment.

As represented in FIG. 9, the exemplary valve controller includes at least one motor 104. The motor 104 is in operative connection with a transmission generally referred to as 106. The transmission of the exemplary embodiment includes a plurality of connected gears or similar motion transmission devices that are selectively moved through operation of the motor 104. The transmission 106 of the exemplary arrangement is operative to move the actuator pin 98, rotatable member 100 and other structures which control the positioning of the valve components in a coordinated manner so as to achieve the desired coordinated operation of the valve structures. Further the exemplary valve controller includes an encoder 108. The encoder 108 moves in coordinated relation with one or more components of the transmission. One or more sensors (such as an optical sensor) is in operative connection with the encoder through operation of control circuitry such as is described in the incorporated disclosures. The encoder and associated sensor or sensors may be utilized to determine the then current status and/or position of the valve components so as to enable the valve controller to selectively move the various components associated with the valve in the desired manner. Of course it should be understood that the transmission, motor, encoder and other structures of the valve controller shown are exemplary and in other embodiments, other types of valve controller arrangements may be utilized.

Figure 10:
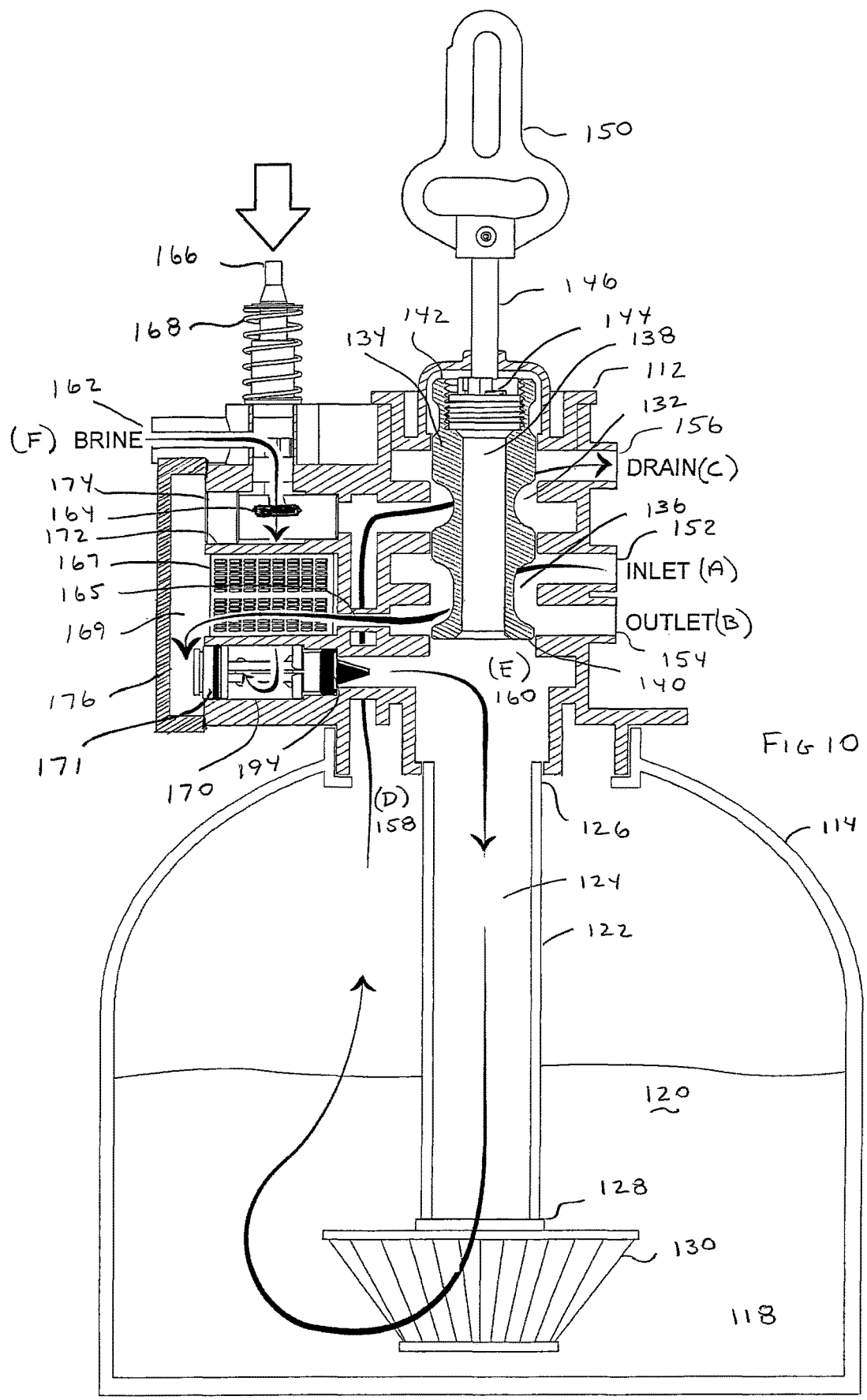
FIG. 10 is a schematic cross-sectional view of an alternative exemplary control valve.
Figure 16:
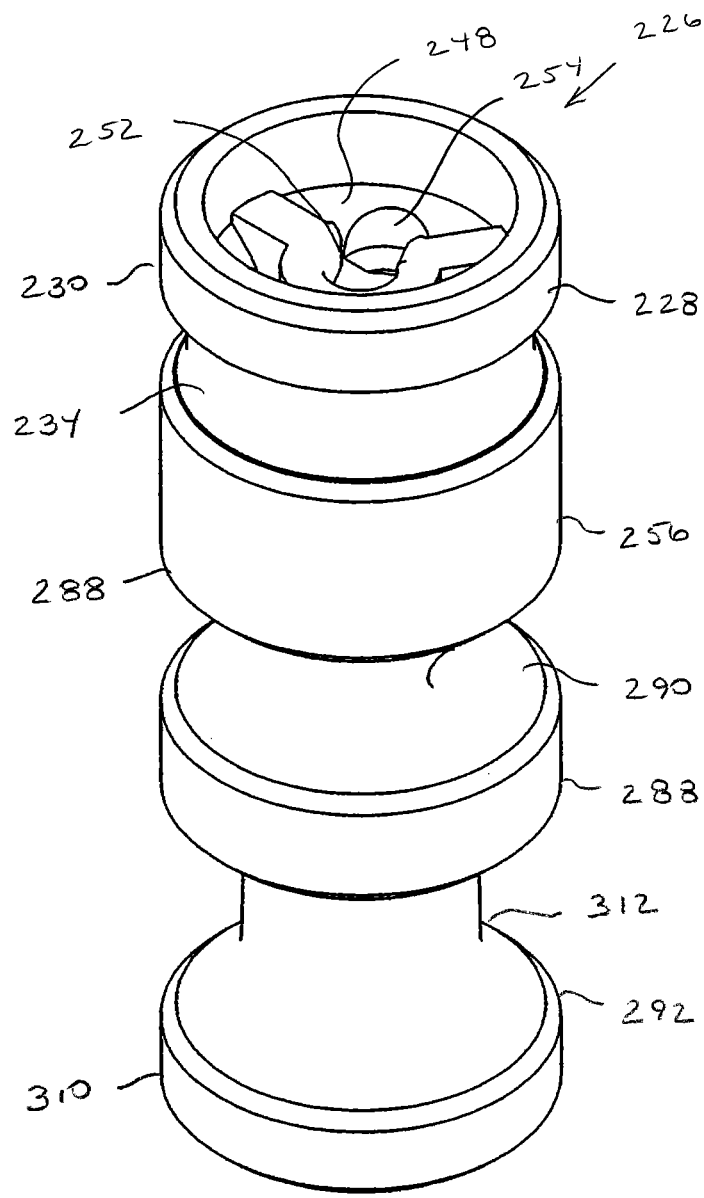
FIG. 16 is a front top left perspective view of the alternative piston.
Figure 17:
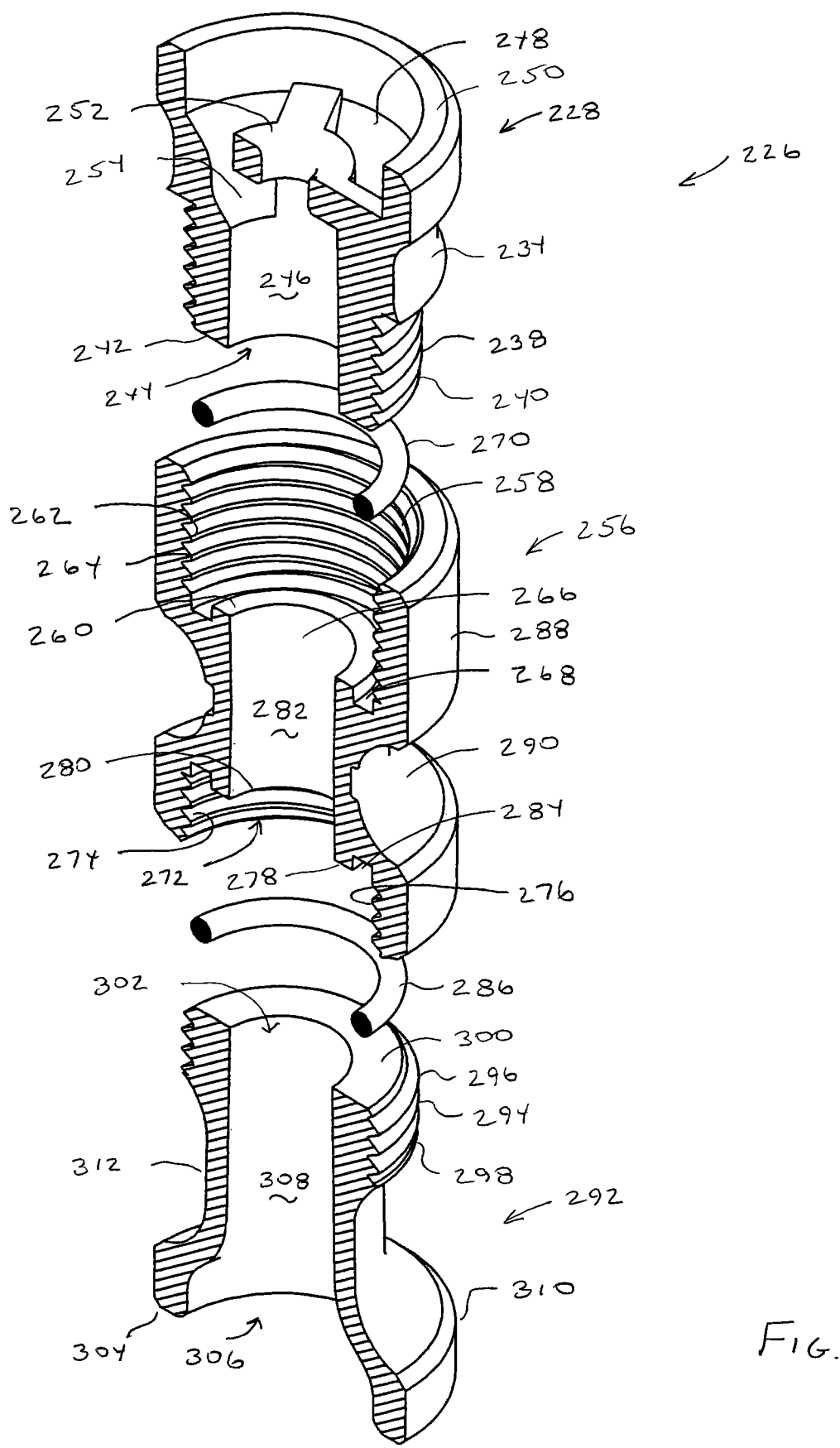
FIG. 17 is a front top left perspective exploded view of the exemplary alternative piston.

FIG. 10 shows schematically an alternative embodiment of a control valve generally indicated 110. Control valve 110 is generally similar to control valve 10 previously described except as otherwise mentioned. Control valve 110 corresponds to a control valve that has been reconfigured so as to enable the carrying out of different functional processes as discussed herein.

Control valve 110 includes a valve body 112. Valve body 112 is configured for operative attachment to the water treatment tank 114. This may be for example by releasable threaded connection. In exemplary arrangements valve body 112 may be identical to body 12. Like the previously described water treatment tank, the exemplary tank has a top portion 116 and a bottom portion 118. The exemplary tank houses water treatment material such as a resin material 120. The resin material may be one of the types like those previously described. Of course other types of water treatment materials or combinations of materials may be used in other embodiments. Further it should be understood that the water treatment process performed using the control valve is merely one example of an application for the particular control valve arrangement.

The exemplary water treatment tank includes therein a tube 122 which provides a conduit 124 between the top and bottom portions of the tank. The top end of the tube 126 is operatively connected to the valve body 112. The bottom end of the tube 128 is in operative connection with a strainer 130.

Similar to the previously described control valve 10, the valve body 112 includes at least one movable valve element. The exemplary valve includes a generally cylindrical, longitudinally extending bore 132. A piston 134 is selectively movable in the longitudinal direction within the bore 132. It should be noted that the exemplary piston 134 has the same configuration as piston 34 of the previously described embodiment. As in the prior embodiment the exemplary valve is configured to enable the piston to be changeable.

As discussed in connection with the previously described embodiment, piston 134 includes a plurality of annular recesses which define annular flow cavities 136. Annular flow cavities also generally surround the bore and are longitudinally spaced within the body of the valve. Piston 134 also includes a longitudinal flow cavity therethrough 138. Piston 134 includes a first longitudinal end 140 and a second longitudinal end 142. As in the case with the previously described embodiment, the second longitudinal end includes a threaded portion adjacent the second longitudinal end 144 which is releasably engageable with a coupling 144. The coupling 144 of the exemplary arrangement provides for operative releasable connection of the piston 134 and a piston rod 146. As with the prior embodiment, the coupling 144 enables fluid to flow therethrough through the longitudinal flow cavity 138 of the piston.

In the exemplary arrangement associated with the control valve 110, the piston 146 is in operative connection with an actuator bracket 150. Actuator bracket 150 is configured to be moved by a valve controller which may be similar to the valve controller 70 previously discussed. Of course it should be understood that in other embodiments, other types of valve controllers may be used.

Like previously described control valve 10, control valve 110 further includes an inlet port 152 which is labeled A for purposes of brevity herein. The valve also includes an outlet port 154 labeled B. The exemplary valve further includes a drain port 156 labeled C. Valve 110 further includes a first tank port 158 labeled D and a second tank port 160 labeled E. The exemplary valve 110 further includes a brine port 162 (labeled F). The brine port F similar to the previously described embodiment, is connected to a fluid passage within the valve which is opened and closed through selective movement of a movable valve member 164. The movable valve member 164 is moved between open and closed positions through movement of a plunger 166 which is biased toward the valve member closing position by a spring 168. As is the case with the prior described embodiment, the plunger 166 may be selectively moved between the open and closed positions of the valve through operation of the valve controller. This may be done by engagement with cam surfaces such as cam surfaces 102 previously described. Of course in other arrangements, other approaches may be used.

Similar to the previously described valve, valve 110 includes a flow passage 165 which is fluidly connected to a chamber 169. A screen 167 is positioned such that fluid passes through the screen 167 to reach the chamber 169.

Valve 110 includes a passage 170 similar to passage 59 that is disposed below the passage 165 as shown and a further passage 172 similar to passage 75 that is disposed above passage 165. An injector 171 that is similar to injector 71 is positioned in passage 170. The injector 171 includes a check valve 194. A plug 174 which may be similar to the plug 61 of the previously described embodiment is positioned in passage 172. In the exemplary embodiment a fluid passage that is not separately shown extends between the passage 172 and passage 170. This fluid passage is separate from the fluid passage 165 and enables the brine port F to communicate with both passages 170 and 172. In this exemplary arrangement, the plug 174 positioned in the passage 172 enables the brine port F to be in communication with the passage 170 and the injector 171. This enables the injector body to be in fluid communication with the brine port when the valve member 164 is open.

In the exemplary valve 110 a removable cover 176 closes the chamber 169. In the exemplary arrangement suitable sealing elements such as gaskets and fastening members such as screws are provided to enable holding the cover to the rest of the valve body and for maintaining the chamber 169 in fluid tight engagement therewith. In the exemplary arrangement the cover 176 enables selectively accessing the passages 170 and 172 as well as the plug and injector that may be positioned therein. This enables the exemplary valve 110 to be configured such that the injector may be selectively positioned in either one of the fluid passages 170 or 172. Likewise the plug 174 can be selectively positioned in the other one of the passages 170 or 172 in which the injector 171 is not currently positioned.

FIGS. 11 and 12 are cutaway views of the portion of the valve body 112 and the passages 170 and 172. In the arrangement shown in FIGS. 11 and 12, the injector 171 is shown positioned in passage 172 while the plug 174 is positioned in passage 170. This corresponds to the configuration of the injector and plug shown in valve 10 that has the positions of the injector and plug reversed from that shown in valve 110. Thus as can be appreciated, the exemplary embodiment of valve 110 enables a person assembling the valve initially to selectively position the injector body 171 and plug 174 in either passage 170 or passage 172 as is appropriate for the operation of the particular control valve. Further this exemplary configuration may enable a service technician or person modifying the valve to remove the cover and change the positions of the injector body and the plug so as to modify the operational capabilities of the valve. Further in other alternative arrangements the valve may be configured to have plugs positioned in both of the passages 170 and 172. This might be done, for example, to have a valve that operates not to have brine solution or other material introduced into the liquid that passes through the valve. Alternatively in still other arrangements injectors or other elements may be positioned in both of the fluid passages. This might be done, for example, in valve configurations where in multiple positions of the piston, it is desirable to introduce brine solution or other material into the liquid flow.

It should also be appreciated that alternative arrangements may be utilized in connection a valve configuration like that described. For example, check valves or other arrangements may be utilized so as to allow fluid flow in an opposite direction from that permitted by the check valve of the injector so that fluid may be enabled to flow into the chamber 169 in certain longitudinal positions of the piston for producing a desired flow path. Further in other alternative arrangements, the chamber 169 may have multiple segregated areas so as to be in connection with additional ports or flow paths through the valve. Such capabilities may provide additional flow alternatives to the valve which enable the valve to provide additional capabilities. As can be appreciated, those skilled in the art can develop numerous changeable valve configurations suitable for different processes and equipment from the description provided herein.

Further in the exemplary arrangement the plug 174 includes disposed annular seals 178 and 180. These disposed annular seals are comprised of resilient material that engage the adjacent walls of the flow passage so as to provide fluid tight engagement therewith. However, as can be appreciated, the body portion 182 of the plug 174 that extends between the seals is spaced inwardly from the annular wall bounding the passage 170. This provides the capability for fluid to occupy and flow in the area between the annular wall bounding the passage and the body portion 182 without the fluid being able to flow directly into the chamber 169 or the passage 184 which can fluidly connect with the area adjacent to the second tank port 160. As can be appreciated, this exemplary construction of the plug 174 when positioned in the passage 172 as represented in FIG. 10 enables the brine solution which enters the passage 172 to flow around the body portion 182 of the plug member and into the chamber 170 to reach the injector 171.

As also shown in FIGS. 11 and 12, the exemplary injector 171 includes disposed annular resilient seals 186, 188 and 190 which engage in sealing relation the adjacent annular wall bounding the passage 172. The exemplary injector includes a liquid inlet 192 similar to opening 63 at a first end, and an outlet from the check valve 194 at the opposed end. In the exemplary arrangement the seals 186 and 188 bound an area 198 which can be filled with the brine solution which is received therein when the valve member 164 is open.

Brine in the area 198 is drawn through openings 200 in the injector body as liquid flows therethrough. This causes the brine solution to be mixed with the liquid as it flows through the injector body in the manner previously discussed. Treated water can also be delivered from area 198 to the port F in an appropriate valve condition like that previously discussed. Of course it should be understood that this injector configuration is exemplary and in other valve and system arrangements, other approaches and configurations may be used.

In the exemplary system used in conjunction with valve 110 and shown in FIG. 10, the valve may be operated in conjunction with the water treatment tank in a manner similar to that previously described in connection with valve 10. However, in this exemplary embodiment, the selective positioning of the piston 134 by the valve controller associated with the valve enables the regeneration of the resin material 120 housed in the tank 114 via the upward flow of the brine solution rather than via a downward flow of the brine solution such as is described in connection with the operation of valve 10 and represented in FIG. 4. In the prior described example of the system used in connection with valve 10, the brine solution acts to regenerate the resin material housed in the tank by flowing from the upper surface thereof and to the bottom area and out the tube 22. In the operation of valve 110, regeneration is accomplished by distributing the brine solution initially from the bottom end of the tube 128 and having the solution migrate radially outwardly from the strainer and upwardly through the resin so as to provide for regeneration thereof. This may be more effective for some resin materials or tank configurations. Further it should be appreciated that because in some exemplary arrangements the piston 134 and valve body 112 may be identical to piston 34 and valve body 12 respectively, the change in capability from downflow regeneration to upflow regeneration may be accomplished by changing the respective positions of the injector and the plug within the valve body and changing the programming associated with the controller so that the controller positions the piston in a different position (e.g. the position shown in FIG. 4 for downflow and the position shown in FIG. 10 for upflow). This is useful in that the need for servicers and installers to have a stock of different valves for upflow and downflow regeneration can be avoided.

As can be appreciated, the method for configuring the exemplary valve for either upflow or downflow regeneration includes removing the cover 176 to access the chamber 169. The injector 171 and the plug 174 are positioned in the passages 170, 172 in the manner appropriate for the regeneration approach desired for the unit. The cover 176 is then installed to fluidly seal chamber 169. The valve controller 70 is programmed via one or more inputs through an appropriate input device such as a laptop or handheld computer, which inputs controller executable instructions that cause the piston to move to the appropriate position for the regeneration approach to be used. Further these method steps can be used to change the regeneration approach of an existing unit. This capability of the exemplary embodiments to be configured as desired without the need to change valve bodies, pistons or actuators can be useful and cost effective.

In the exemplary operation of the valve 110, the valve is enabled to operate in a manner similar to that discussed in connection with valve 10 and is represented in FIGS. 1-3 and 5-7.

It should be appreciated that in the exemplary arrangement, the plug 174 is configured so that treated water can be directed out of the brine port F in a manner similar to that described in FIG. 2 due to the configuration of the plug and the annular flow chamber which extends around the central body portion 182 thereof. As a result, treated water is enabled to be delivered from the area 198 of the injector body, to the brine port and into a brine tank holding material so as to produce a brine solution which can later be introduced to regenerate the resin in a manner like that discussed in connection with the prior embodiment.

When the resin material 120 in the water treatment tank 114 is to be regenerated, the piston 134 is axially moved to the position shown in FIG. 10. In this position, brine solution produced in the brine tank is drawn into the brine port F due to the opening of the movable valve element 164. The brine is drawn through the annular chamber around the central body portion 182 of the plug 174 and passes through the fluid passage into the area 198 of the injector body 171. Water flows from the inlet A through the passage 165 and into the chamber 169. From the chamber 169, the water flows through the injector body 171 where it is mixed with the brine solution and passes downwardly through the tube 122. The regenerate brine laden water then passes through the bottom of the tube 128 through the strainer and upwardly through the resin material 120 where it replaces the ions of contaminants that have been removed from the water previously treated. The released ions and other contaminants flow upwardly through the first tank port D and out through the drain C of the valve. This process is carried out for a sufficient time so as to regenerate the capabilities of the resin to remove undesirable materials from water which is passed therethrough after completion of the resin regeneration cycle. Of course it should be understood that these approaches and configurations are exemplary and in other embodiments, other configurations and process approaches may be utilized. Further it may be appreciated that the water treatment application for valve 110 and the structures and elements described in connection therewith is only one of many exemplary applications in which such elements and structures may be used.

FIG. 13 shows of further alternative embodiment of a liquid treatment control valve 200. Valve 200 may include features similar to those discussed in connection with the previously described valves 10 and 110. Valve 200 includes a valve body 202. Valve 200 further includes an inlet port 204 (labeled A) and an outlet port 206 (labeled B). Valve 200 further includes a drain port 208 (labeled C), a first tank port 210 (labeled D) and a second tank port 212 (labeled E). The exemplary valve further includes a brine port 214 (labeled F). The exemplary liquid treatment valve 200, similar to the previously described valves is in fluid connection with a tank 216 which includes therein a liquid treatment material 218. The liquid treatment material may include a resin material, filtration material or other suitable material for treating the liquid that is passed through the valve and the tank.

Similar to the previously described valves, valve 200 is in operative connection with a valve controller that includes at least one motor therein. The at least one motor is operated to axially position a piston rod 220 via movement of an actuator bracket 222 in a manner like that previously discussed. Of course it should be understood that the previously described valve controller structures are exemplary and in other embodiments other approaches may be used.

Similar to the previously described valves, valve body 202 includes an axially elongated bore 224 therein. A valve element comprising a cylindrical piston 226 is selectively axially positionable by the actuator in the bore 224. By selectively axially positioning the piston 226 in the bore, the exemplary valve is enabled to provide numerous flow conditions similar to those previously discussed. Of course it should be understood that valve 200 is exemplary and in other embodiments other or different flow conditions from those previously discussed may be achieved.

As shown in greater detail in FIGS. 14-17, the exemplary piston is comprised of at least two releasably engageable pieces. The exemplary piston 226 is comprised of three releasably engageable pieces that during operation of the valve are held in engaged relation. A first piece 228 includes an annular outer wall 230. The annular outer wall extends in centered relation relative to a longitudinal axis 232. An annular first piece recess 234 extends in the annular outer wall 230. Recess 234 performs the function of one of the annular flow cavities that extend in the pistons of the valves that have been previously discussed.

The exemplary first piece 228 further includes an axially centered first piece projection 236. First piece projection 236 is bounded by an annular outer cylindrical wall 238. The annular outer cylindrical wall 238 extends parallel to the axis and includes at least one radially extending projection or recess thereon. In the exemplary arrangement the at least one projection or recess includes threads 240. However it should be understood that in other arrangements the at least one radially extending projection or recess may include other types of structures that are suitable for releasably engaging and holding pieces of the piston together in engaged relation, such as twist locks, clips, bayonet type connectors and other connecting structures. The exemplary first piece projection 236 terminates in a radially extending first end surface 242. The exemplary first end surface 242 includes a first inner opening 244 therein. The first inner opening 244 is in fluid connection with an axially extending passage 246 that extends in the first piece 228.

First piece 228 includes a radially extending further first end surface 248. Surface 248 in the exemplary arrangement is axially recessed from an annular upper surface 250 of the first piece 228. End surface 248 extends on the first piece at an end that is axially opposed of the first end surface 242. The exemplary further end surface 248 includes a piston rod coupling 252 thereon. The exemplary piston rod coupling 252 is releasably engageable with piston rod 220. An outer opening 254 extends through end surface 248. Outer opening 254 is in fluid communication with the axially extending passage 246. The outer opening 254 is configured such that fluid may pass therethrough when the piston rod coupling 254 is engaged with the piston rod.

The exemplary piston 226 further includes a second piece 256. The exemplary second piece includes a cylindrical axially centered second piece recess 258. Recess 258 is configured to receive the first piece projection 236 therein. Exemplary recess 258 terminates axially within the second piece at a radially extending second end surface 260. The second piece recess 258 is bounded radially by an annular recess wall 262. The annular recess wall 262 includes at least one further radially extending projection or recess. In the exemplary arrangement the at least one radially extending projection or recess of the annular recess wall 262 includes threads 264 that are engaged with threads 240 of the first piece. Of course it should be understood that in other arrangements other types of interengaging projections and recesses may be used.

In the exemplary arrangement the second end surface 260 includes an axially centered second end opening 266 therein. The second end surface further includes an annular recess 268 that extends in surrounding relation of the second end opening 266. An annular resilient piston seal 270 is positioned axially in intermediate relation and in fluid tight engagement with each of the first piece 228 and the second piece 256. In the exemplary arrangement the seal 270 extends in the annular recess 268. Of course it should be understood that this configuration is exemplary and in other arrangements other seal retaining structures may be utilized, which may include without limitation, a recess in first end surface 242 of the first piece and/or annular recesses in each of the first piece and the second piece. Further it should be understood that in other arrangements annular recesses to help position a seal need not be provided.

Exemplary second piece 256 further includes a further second piece recess 272. Recess 272 is a cylindrical radially centered recess that is bounded by a further annular recess wall 274. The further annular recess wall 274 includes at least one further additional radially extending projection or recess which in the exemplary arrangement comprises threads 276. The exemplary second piece recess 272 is bounded axially inward in the second piece by a radially extending further second end surface 278. Radially extending further second end surface 278 includes a further second end opening 280 therein. An axially extending passage 282 fluidly extends between the further second end opening 280 and the second end opening 266.

In the exemplary arrangement the radially extending second end surface 278 includes therein a further annular recess 284. The further annular recess 284 is in axially centered relation with the further second end opening 280. A further annular resilient piston seal 286 extends in the annular recess 284. Second piece 256 further includes a cylindrical second piece annular outer wall 288. Second piece annular outer wall 288 includes an annular second piece recess 290. Recess 290 serves as an annular flow cavity of the exemplary piston 266.

The exemplary piston 266 further includes a third piece 292. Third piece 292 includes an axially centered third piece projection 294. Third piece projection 294 includes an annular outer third piece cylindrical wall that extends parallel to the axis 232. The annular outer third piece cylindrical wall 296 includes at least one additional radially extending projection or recess. In the exemplary arrangement the radially extending projection or recess of cylindrical wall 296 comprises threads 298 that are in interengaged relation with threads 276 of the second piece 256.

Of course it should be understood that this arrangement is exemplary and in other embodiments other releasably engageable projections and recesses for engaging the pieces of the piston in a releasably engageable manner may be used.

The exemplary third piece projection 294 terminates axially inwardly at a radially extending third end surface 300. Exemplary third end surface 300 includes therein an axially centered third end opening 302. The exemplary resilient annular piston seal 286 extends axially intermediate and in fluid tight relation with each of the third end surface 300 and the second end surface 278. The engagement of the seal 286 in the annular recess 284 helps to position the seal in a proper position to maintain fluid tight relation between the third piece 292 and the second piece 256. Of course it should be understood that in other arrangements the annular recess may be included in the third piece instead of in the second piece, or that both the second piece and the third piece may include such recesses. In still other exemplary arrangements the seal may not require such annular recesses to provide suitable seal positioning.

The exemplary third piece 292 of the piston 266 includes a further third end surface 304. Further third end surface 304 is axially disposed on the third piece from the third end surface 300. Further third end surface 304 includes therein an axially centered further third end opening 306. Further third end opening 306 is in fluid communication with a third axially extending passage 308. Third axially extending passage 308 fluidly extends between further third end opening 306 and third end opening 302.

The exemplary third piece 292 includes a third piece annular outer wall 310. Annular outer wall 310 includes an annular third piece recess 312 that extends therein. The exemplary annular third piece recess 312 serves as an annular flow cavity of the exemplary piston 226. As can be appreciated the first piece 228, second piece 256 and third piece 292 of the exemplary piston 226 is configured such that when the interengaging projections and recesses which hold the pieces together are fully engaged, the respective radially extending abutting surfaces such as first end surface 242 and second end surface 260, and third end surface 302 and end surface 278 are engaged such that the relative positions of the annular recesses 234, 290, 312 are in the desired axially spaced relation. As a result the axial positioning of the top first piece 228 of piston 226 by the at least one motor of the valve controller results in the plurality of axially disposed annular recesses on the exterior of the piston being precisely positioned so that the annular flow passages provide the desired flow conditions of the valve.

As can be appreciated, in the assembled condition of the piston 226 the aligned fluid passages 308, 282 and 246 provide fluid communication between the further third end opening 306 and the outer opening 254. As a result the passages provide a longitudinal flow passage through the entire axial length of the piston in a manner similar to longitudinal flow cavity 38 of piston 34 previously discussed. Further in the exemplary arrangement, the annular resilient piston seals 270 and 286 maintain the passage that extends axially through the interior of the piston fluidly separated from fluid in contact with the outer cylindrical surfaces of the piston. Further in the exemplary arrangement the resilient seals 270, 286 engage the immediately adjacent pieces in contacting relation. Such resilient contact by the seals on each axial side thereof serves to reduce the risk of relative rotational movement of the first piece 228 and the second piece 256, as well as the relative rotational movement of the second piece 256 and the third piece 292.

In exemplary arrangements the piston structure which is comprised of at least two releasably engaged piston pieces, enables the assembly of pistons which have different annular flow cavities located in different axial positions. This enables providing different desired flow properties for fluid flow within a valve body. Further in exemplary arrangements different configurations of pistons may be produced by selectively engaging and disengaging piston pieces having different configurations. This enables changing the flow characteristics of the particular valve. Further in exemplary arrangements, the releasably engageable piston pieces may be comprised of molded plastic or other suitable materials that can be readily formed in different desired dimensions, contours and configurations. Such contours may be provided so as to achieve desired flow properties for the flow of liquid through the different annular passages. Of course it should be understood that these approaches are exemplary, and in other arrangements other approaches may be used.

Thus the exemplary embodiments achieve improved operation, eliminate difficulties encountered in the use of prior valve devices and systems and attain the useful results described herein.

In the foregoing description, certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the new and useful concepts are not limited to the features shown and described.

It should be understood that the features and/or relationships associated with one embodiment can be combined with features and/or relationships from another embodiment. That is, various features and/or relationships from various embodiments can be combined in further embodiments. The inventive scope of the disclosure is not limited to only the embodiments shown or described herein.

Having described the features, discoveries and principles of the exemplary embodiments, the manner in which they are constructed and operated, and the advantages and useful results attained, the new and useful features, devices, elements, arrangements, parts, combinations, systems, equipment, operations, methods, processes and relationships are set forth in the appended claims.

We claim:

1. An apparatus comprising:
   a valve configured for use in connection with a liquid treatment tank,
   comprising:
   a valve body, wherein the valve body includes
      a plurality of fluid ports,
      wherein the ports include
         an untreated liquid port (A), wherein the untreated liquid port is configured to be operatively connected to a source of untreated liquid at elevated pressure,
         a treated liquid port (B), wherein the treated liquid port is configured to be operatively connected to at least one treated liquid use device,
         a drain port (C), wherein the drain port is configured to be operatively connected to a waste liquid drain,
         a first tank port (D), wherein the first tank port is configured to be operatively connected to a first area of the tank disposed on a first side of a liquid treatment material in the tank,
         a second tank port (E), wherein the second tank port is configured to be operatively connected to a second area of the tank disposed on a second side of the liquid treatment material in the tank,
         a further port (F), wherein the further port F is configured to be in operative connection with a further tank,
   an axially movable piston within the valve body,
   a plurality of flow cavities, wherein the piston is in operative connection with the plurality of flow cavities, wherein selected ports are enabled to be in fluid connection through the flow cavities,
   at least one motor, wherein the at least one motor is operable to selectively axially move the piston to a plurality of positions, wherein
      in a first position ports A and D and ports B and E are in fluid connection through the valve, whereby untreated liquid from the inlet port A is enabled to be treated by passing through the treatment material and delivered from the valve through treated liquid port B,
      in a second position ports A, B and E, and ports D and C are in fluid connection through the valve, whereby untreated liquid is enabled to backwash the treatment material and to be discharged to the drain port C, in a third position ports A, B and D and ports E and C are in fluid connection through the valve, whereby treated and untreated liquid are enabled to pass through the treatment material to the drain, in a fourth position port A is not in fluid connection with any other port, whereby flow of untreated liquid through the valve is enabled to be shut off, in a fifth position ports A and B are in fluid connection through the valve, whereby the untreated liquid delivered at port A is enabled to be passed to the outlet port B and thereby bypass the tank, wherein the valve includes at least one movable further valve member, wherein movement of the at least one further valve member is operative to selectively cause the further port F to be fluidly open to at least one flow cavity in the valve and closed off from at least some flow cavities in the valve, wherein the at least one motor is in operative connection with the at least one further valve member, wherein the at least one motor is operative to cause the at least one valve element to be positioned in the first position and to move the at least one further valve member such that treated liquid is enabled to be delivered from port E to further port F so as to enable treated liquid to be added to the further tank.

2. The apparatus according to claim 1
wherein the piston includes
a releasably engageable first piece and second piece in engaged relation,
  wherein the first piece includes an axially centered first piece projection,
  wherein the first piece projection includes an annular outer cylindrical wall that extends parallel to the axis,
  wherein the annular outer cylindrical wall includes at least one radially extending projection or recess thereon,
  wherein the first piece projection terminates axially at a radially extending first end surface,
  wherein the second piece includes an axially centered second piece recess,
  wherein the second piece recess includes a cylindrical recess bounded by an annular recess wall, wherein the first piece projection extends within the annular recess,
    wherein the annular recess wall of the second piece recess includes at least one further radially extending projection or recess in releasable engagement with the at least one radially extending projection or recess of the first piece,
  wherein the second piece recess terminates axially within the second piece at a radially extending second end surface,
an annular resilient piston seal, wherein the annular resilient piston seal extends axially and in fluid tight engagement with each of the first radially extending end surface and the second radially extending end surface.

3. The apparatus according to claim 2
wherein one of the first end surface and the second end surface includes an annular recess,
wherein the annular resilient piston seal extends in the annular recess.

4. The apparatus according to claim 3
wherein the first piece includes a further first end surface, wherein the further first end surface is axially disposed of the first end surface on the first piece,
a first axially extending passage therein, wherein the first axially extending passage fluidly extends between
  a first inner opening, wherein the first inner opening extends in the first end surface, and
  a first outer opening, wherein the first outer opening extends in the further first end surface.

5. The apparatus according to claim 4
wherein the second piece includes a second axially extending passage,
wherein the second axially extending passage fluidly extends between
  a second end opening, wherein the second end opening extends in the second end surface, and
  a further second end opening, wherein the further second end opening extends in a radially extending further second end surface, wherein the further second end surface is axially disposed on the second piece from the second end surface,
wherein the second axially extending passage is in fluid connection with the first axially extending passage.

6. The apparatus according to claim 5
wherein the piston further includes a releasably engageable third piece, wherein the third piece is engaged with the second piece,
wherein the third piece includes an axially centered third piece projection,
  wherein the third piece projection includes an annular outer third piece cylindrical wall that extends parallel to the axis,
  wherein the annular outer third piece cylindrical wall includes at least one additional radially extending projection or recess,
  wherein the annular outer third piece projection terminates axially at a radially extending third end surface,
wherein the second piece includes a cylindrical axially centered further second piece recess, wherein the further second piece recess is axially disposed on the second piece from the second piece recess, and wherein the third piece projection extends in the further second piece recess,
wherein the further cylindrical second piece recess is bounded by a further annular recess wall,
  wherein the further annular recess wall includes at least one further additional radially extending projection or recess in releasable engagement with the at least one additional projection or recess on the annular outer third piece cylindrical wall,
wherein the further second piece recess terminates axially within the second piece at the radially extending second end surface,
a further annular resilient piston seal, wherein the further annular resilient piston seal extends axially and in fluid tight relation with each of the third end surface and the further second end surface.

7. The apparatus according to claim 6
wherein one of the third end surface or the further second end surface includes a further annular recess,
wherein the further annular resilient piston seal extends in the further annular recess.

8. The apparatus according to claim 7
wherein the third piece includes a third axially extending passage, wherein the third axially extending passage fluidly extends between
a third end opening, wherein the third end opening extends in the third end surface, and
a further third end opening, wherein the further third end opening extends in a radially extending further third end surface, wherein the further third end surface is axially disposed on the third piece from the third end surface,
wherein the third axially extending passage is in fluid connection with the second axially extending passage.

9. The apparatus according to claim 8, and further comprising:
A piston rod, wherein the piston rod is in operative connection with the at least one motor,
a piston rod coupling, wherein the piston rod coupling is in operative connection with the further first end surface,
wherein the piston is operatively engaged with the piston rod through the piston rod coupling.

10. The apparatus according to claim 9
wherein the at least one radially extending projection or recess of the first piece projection and the at least one further radially extending projection or recess of the annular recess wall comprise interengaging threads, and
wherein the at least one additional radially extending projection or recess of the annular outer third piece cylindrical wall and the at least one further additional radially extending projection or recess of the further annular recess wall comprise further interengaging threads.

11. The apparatus according to claim 10
wherein the first piece includes a first piece annular outer wall,
wherein the first piece annular outer wall includes an annular first piece recess therein, wherein the annular first piece recess comprises a flow cavity.

12. The apparatus according to claim 10
wherein the second piece includes a second piece annular outer wall,
wherein the second piece annular outer wall includes an annular second piece recess therein, wherein the annular second piece recess comprises a flow cavity.

13. The apparatus according to claim 10
wherein the third piece includes a third piece annular outer wall,
wherein the third piece annular outer wall includes an annular third piece recess therein, wherein the annular third piece recess comprises a flow cavity.

14. The apparatus according to claim 12
wherein in the fourth position fluid pressure at treated liquid port B is maintained,
wherein in a sixth position port A is not in fluid communication with any other port, whereby flow of untreated liquid through the valve is enabled to be shut off,
and wherein in the sixth position fluid pressure on the treated liquid port B is relieved to drain port C.

15. The apparatus according to claim 2
wherein the piston further includes a releasably engageable third piece, wherein the third piece is engaged with the second piece,
wherein the third piece includes an axially centered third piece projection,
wherein the third piece projection includes an annular outer third piece cylindrical wall that extends parallel to the axis,
wherein the annular outer third piece cylindrical wall includes at least one additional radially extending projection or recess,
wherein the annular outer third piece projection terminates axially at a radially extending third end surface,
wherein the second piece includes a cylindrical axially centered further second piece recess, wherein the further second piece recess is axially disposed on the second piece from the second piece recess, and wherein the third piece projection extends in the further second piece recess,
wherein the further cylindrical second piece recess is bounded by a further annular recess wall,
wherein the further annular recess wall includes at least one further additional radially extending projection or recess in releasable engagement with the at least one additional projection or recess on the annular outer third piece cylindrical wall,
wherein the further second piece recess terminates axially within the second piece at a radially extending further second end surface,
a further annular resilient piston seal, wherein the further annular resilient piston seal extends axially and in fluid tight relation with each of the third end surface and the further second end surface.

16. An apparatus comprising:
valve configured for use in connection with a liquid treatment tank,
comprising:
a valve body, wherein the valve body includes
a plurality of fluid ports,
wherein the ports include
an untreated liquid port (A), wherein the untreated liquid port is configured to be operatively connected to a source of untreated liquid at elevated pressure,
a treated liquid port (B), wherein the treated liquid port is configured to be operatively connected to at least one treated liquid use device,
a drain port (C), wherein the drain port is configured to be operatively connected to a waste liquid drain,
a first tank port (D), wherein the first tank port is configured to be operatively connected to a first area of the tank disposed on a first side of a liquid treatment material in the tank,
a second tank port (E), wherein the second tank port is configured to be operatively connected to a second area of the tank disposed on a second side of the liquid treatment material in the tank,
a piston axially movable within the valve body,
wherein the piston comprises at least two releasibly engageable cylindrical pieces,
a plurality of flow cavities, wherein the piston is in operative connection with the plurality of flow cavities, wherein selected ports are enabled to be in fluid connection through the flow cavities,
at least one motor, wherein the at least one motor is operable to selectively move the piston to a plurality of axial positions, wherein
in a first piston position
ports A and D are fluidly connected through the valve and neither of ports A or D is fluidly connected with ports B, C or E through the valve, and
ports B and E are fluidly connected through the valve and neither of ports B or E is fluidly connected with ports A, C or D through the valve, whereby untreated liquid from the inlet port A is enabled to be treated by passing through the treatment material and delivered from the valve through treated liquid port B, in a second piston position ports A, B and E are fluidly connected through the valve and none of ports A, B or E is fluidly connected with ports D or C through the valve, and ports D and C are fluidly connected through the valve and neither of ports D or C is fluidly connected with ports A, B or E through the valve, whereby untreated liquid is enabled to backwash the treatment material and to be discharged to the drain port C, in a third piston position ports A, B and D are fluidly connected through the valve and none of ports A, B or D is fluidly connected to ports E or C through the valve, and ports E and C are fluidly connected through the valve and neither of ports E or C is fluidly connected to ports A, B or D through the valve, whereby treated and untreated liquid are enabled to pass through the treatment material to the drain, in a fourth piston position port A is not in fluid connection with any of ports B, C, D or E through the valve, whereby flow of untreated liquid through the valve is enabled to be shut off, in a fifth piston position ports A and B are fluidly connected through the valve and neither of ports A or B is fluidly connected to ports C, D or E through the valve, whereby the untreated liquid delivered at port A is enabled to be passed to the outlet port B and thereby bypass the tank.

17. The apparatus according to claim 16
wherein the piston includes a releasably engageable first piece and second piece in engaged relation,
wherein the first piece includes an axially centered first piece projection, wherein the first piece projection includes an annular outer cylindrical wall that extends parallel to the axis,
wherein the annular outer cylindrical wall includes at least one radially extending projection or recess thereon,
wherein the first piece projection terminates axially at a radially extending first end surface,
wherein the second piece includes an axially centered second piece recess,
wherein the second piece recess includes a cylindrical recess bounded by an annular recess wall, wherein the first piece projection extends within the second piece recess,
wherein the annular recess wall of the second piece recess includes at least one further radially extending projection or recess in releasable engagement with the at least one radially extending projection or recess of the first piece,
wherein the second piece recess terminates axially within the second piece at a radially extending second end surface.

18. The apparatus according to claim 17
wherein the piston further includes a releasably engageable third piece, wherein the third piece is engaged with the second piece,
wherein the third piece includes an axially centered third piece projection,
wherein the third piece projection includes an annular outer third piece cylindrical wall that extends parallel to the axis,
wherein the annular third piece cylindrical wall includes at least one additional radially extending projection or recess,
wherein the annular outer third piece projection terminates axially at a radially extending third end surface,
wherein the second piece includes a cylindrical axially centered further second piece recess, wherein the further second piece recess is axially disposed on the second piece from the second piece recess, and wherein the third piece projection extends in the further second piece recess,
wherein the further cylindrical second piece recess is bounded by a further annular recess wall,
wherein the further annular recess wall includes at least one further additional radially extending projection or recess in releasable engagement with the at least one additional projection or recess on the annular outer third piece cylindrical wall,
wherein the further second piece recess terminates axially within the second piece at the axially extending second end surface,
an annular resilient piston seal, wherein the annular resilient piston seal extends axially and in fluid tight engagement with each of the first radially extending end surface and the second radially extending end surface,
a further annular resilient piston seal, wherein the further annular resilient piston seal extends axially and in fluid tight relation with each of the third end surface and the further second end surface.

19. The apparatus according to claim 17
wherein in the fourth piston position fluid pressure at treated liquid port B is maintained,
wherein in a sixth piston position port A is not in fluid communication with any other port, whereby flow of untreated liquid through the valve is enabled to be shut off,
and wherein in the sixth piston position fluid pressure on the treated liquid port B is relieved to drain port C.

20. The apparatus according to claim 18
wherein the first, second and third pieces are comprised of molded plastic.

* * * * *